United States Patent
Higashiura

(10) Patent No.: US 7,898,684 B2
(45) Date of Patent: Mar. 1, 2011

(54) IMAGE READING APPARATUS, IMAGE PROCESSING SYSTEM, AND IMAGE RECORDING APPARATUS

(75) Inventor: Masaki Higashiura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 992 days.

(21) Appl. No.: 11/376,582

(22) Filed: Mar. 14, 2006

(65) Prior Publication Data
US 2006/0209326 A1 Sep. 21, 2006

(30) Foreign Application Priority Data
Mar. 15, 2005 (JP) .............................. 2005-073777

(51) Int. Cl.
H04N 1/40 (2006.01)
G06K 15/00 (2006.01)
G06F 3/12 (2006.01)

(52) U.S. Cl. .................... 358/1.17; 358/1.14; 358/1.15; 358/1.16; 358/1.18; 358/3.28

(58) Field of Classification Search ................. 358/358, 358/1.9, 5.04, 5.19, 3.28, 3.3, 474, 500, 505, 358/530, 539, 1.14–1.18; 380/229
See application file for complete search history.

(56) References Cited

U.S. PATENT DOCUMENTS

| | | | | |
|---|---|---|---|---|
| 5,710,634 A * | 1/1998 | Kuriyama et al. | ........... | 358/296 |
| 5,909,602 A * | 6/1999 | Nakai et al. | ..................... | 399/8 |
| 6,366,366 B1 * | 4/2002 | Nakamura | .................. | 358/487 |
| 7,372,594 B1 * | 5/2008 | Kusakabe et al. | ............. | 358/1.9 |
| 2002/0063889 A1 * | 5/2002 | Takemoto et al. | ........... | 358/1.15 |
| 2004/0179220 A1 * | 9/2004 | Van Oosterhout | .......... | 358/1.13 |
| 2004/0190080 A1 * | 9/2004 | Kodama et al. | ............. | 358/474 |
| 2004/0233465 A1 * | 11/2004 | Coyle et al. | .................. | 358/1.9 |
| 2005/0046890 A1 * | 3/2005 | Shudo | ........................ | 358/1.14 |
| 2005/0200910 A1 * | 9/2005 | Kanoshima et al. | ......... | 358/448 |

FOREIGN PATENT DOCUMENTS

| | | |
|---|---|---|
| JP | 07-129512 | 5/1995 |
| JP | 07-154617 | 6/1995 |
| JP | 2000-353171 | 12/2000 |
| JP | 2003-345760 | 12/2003 |

* cited by examiner

*Primary Examiner*—James A Thompson
(74) *Attorney, Agent, or Firm*—Edwards Angell Palmer & Dodge LLP; David G. Conlin; George N. Chaclas

(57) ABSTRACT

An image reading apparatus comprises: reading means for reading an image recorded on a sheet; detecting means for detecting plural kinds of patterns from the read image; storing means for storing processing information used in processing to be executed, in a manner corresponding to pattern information concerning a combination of patterns; means for acquiring information concerning a combination of detected patterns on the basis of a detection result when said detecting means detects a pattern from each of the images read from a plurality of sheets; means for searching for the acquired information in the pattern information stored in said storing means; means for reading from said storing means the processing information stored in a manner corresponding to the pattern information, when the pattern information has been found by the above-mentioned means; and means for executing said processing using the read processing information.

26 Claims, 25 Drawing Sheets

FIG. 2
FIRST PAGE (FRONTSIDE)
101a
101
FIRST PAGE (BACKSIDE)
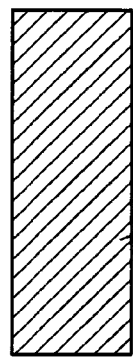
101b
101
SECOND PAGE (FRONTSIDE)
102a
102
SECOND PAGE (BACKSIDE)
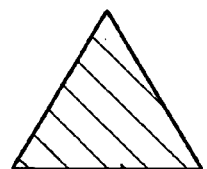
102b
102

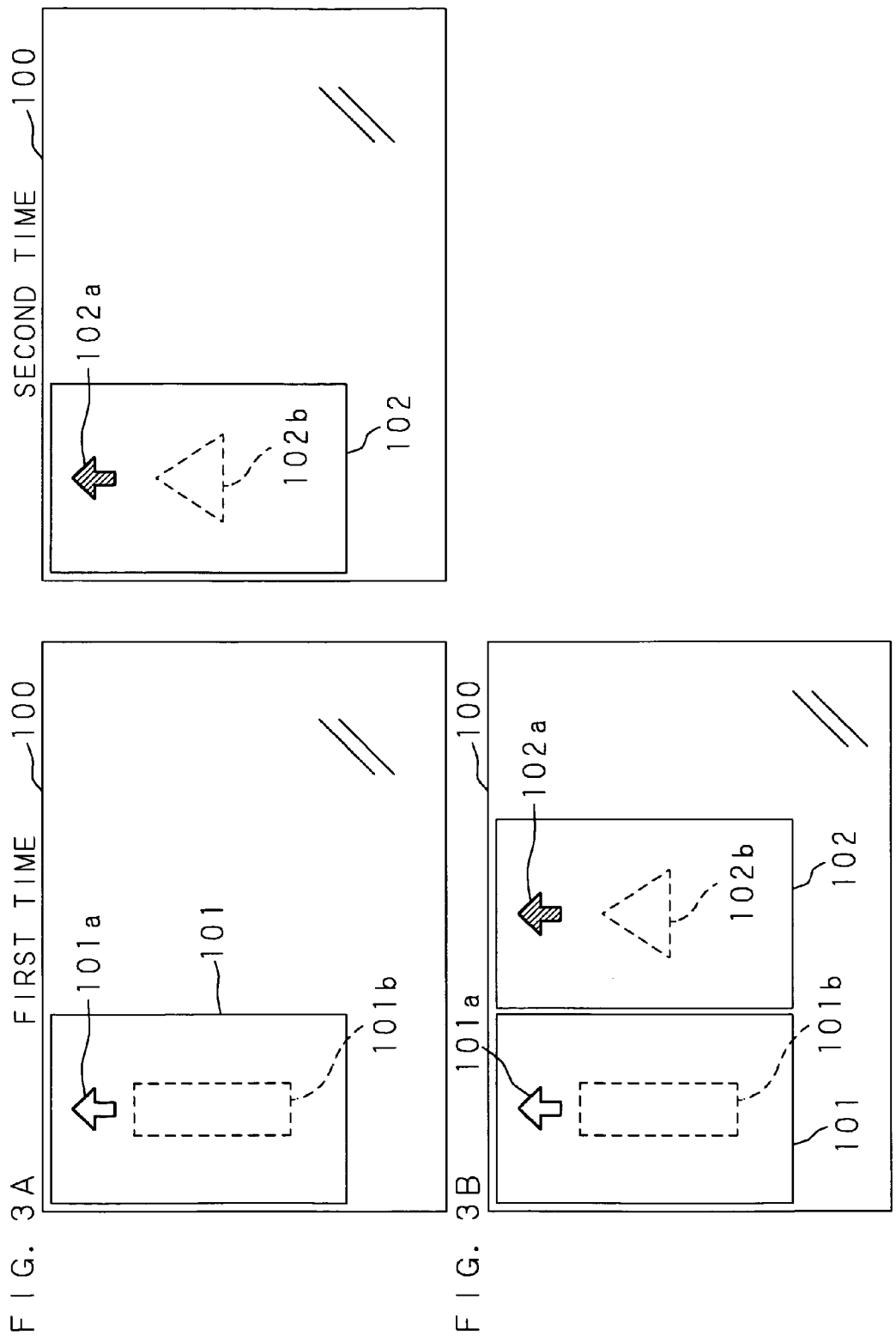

FIG. 5A

PREPARATION OF AUTHENTICATION SHEETS AND SETTING SHEETS

PLEASE SELECT A KIND OF SHEET YOU INTEND TO PREPARE.

- AUTHENTICATION SHEETS (211)
- SETTING SHEETS — 212
- OK — 213
- CANCEL — 214

PREPARATION OF SETTING SHEETS

PLEASE SELECT FUNCTION FOR SETTING.

- COPY (221)
- IMAGE TRANSMISSION — 222
- OK — 223
- CANCEL — 224

INPUT OF SETTING CONDITION (COPY FUNCTION)

PLEASE SET CONDITION FOR COPY.

- COPY DENSITY: 100 % — 231
- MAGNIFICATION FACTOR: 95 % — 232
- NUMBER OF COPIES: 8 COPIES — 233
- OK — 235
- CANCEL — 236

(230)

FIG. 6
| AUTHENTI-CATION CODE | COMBINATION OF PATTERNS | |
|---|---|---|
| 0001 | 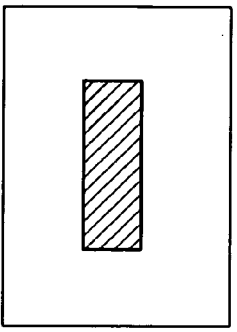 | 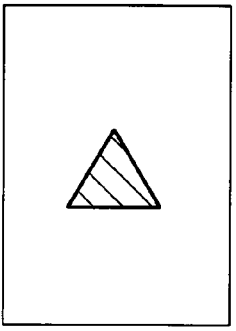 |
| 0002 | 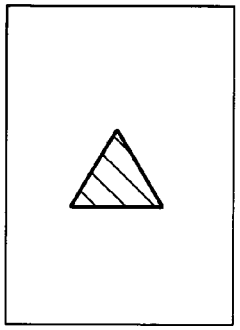 | 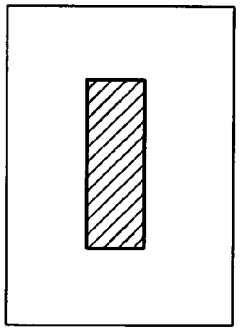 |
| 0003 | 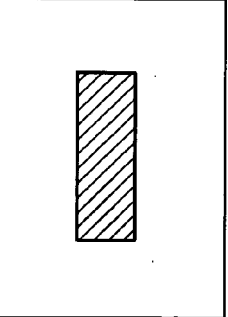 | 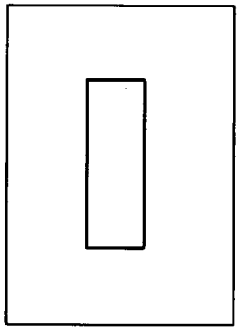 |
| ⋮ | ⋮ | ⋮ |

FIG. 7
| SETTING CONDITION | COMBINATION OF PATTERNS |
|---|---|
| FUNCTION : COPY<br><br>COPY DENSITY : 100%<br>MAGNIFICATION<br>　　　FACTOR : 95%<br>NUMBER OF COPIES :<br>　　　8 COPIES | 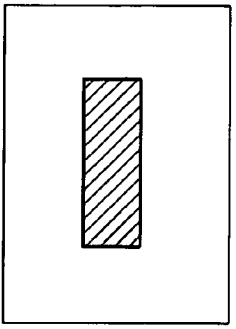 |
| FUNCTION : COPY<br><br>COPY DENSITY : 100%<br>MAGNIFICATION<br>　　　FACTOR : 120%<br>NUMBER OF COPIES :<br>　　　1 COPY | 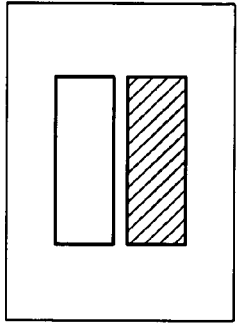 |
| FUNCTION :<br>IMAGE TRANSMISSION<br><br>TRANSMISSION<br>DESTINATION :<br>　　　06-OOOO-xxxx | 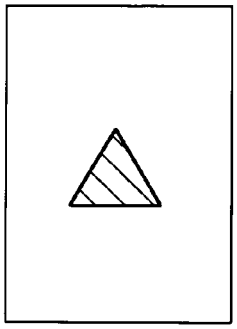 |
| ⋮ | ⋮ |

FIG. 8
| AUTHENTI-CATION CODE | PLACING POSITION OF SHEETS |
|---|---|
| 0001 | 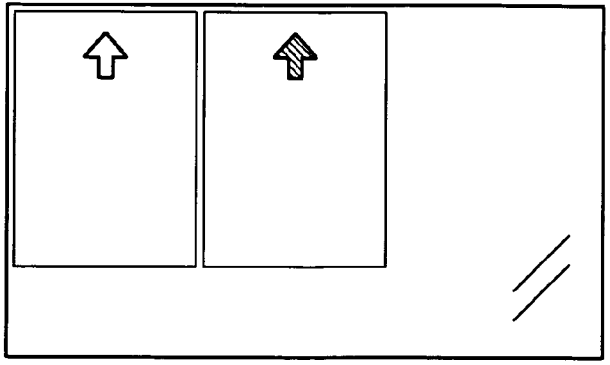 |
| 0002 | 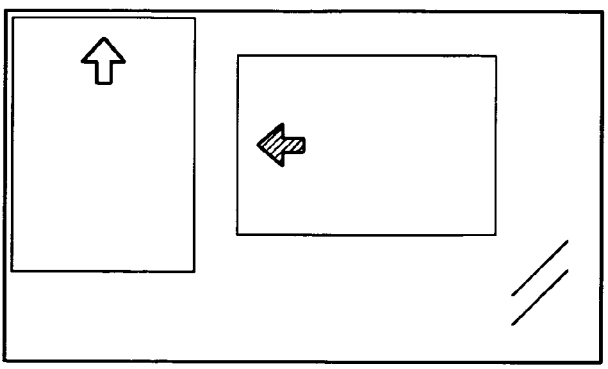 |
| 0003 | 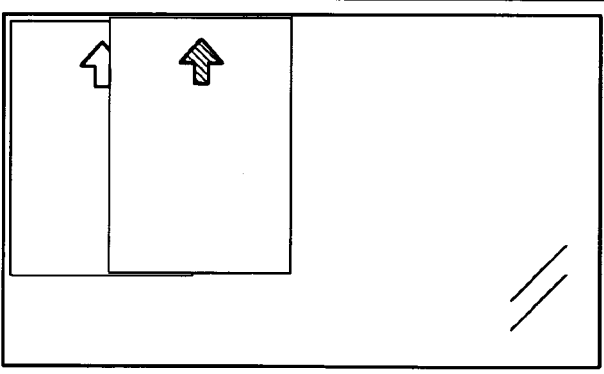 |
| ⋮ | ⋮ |

FIG. 14
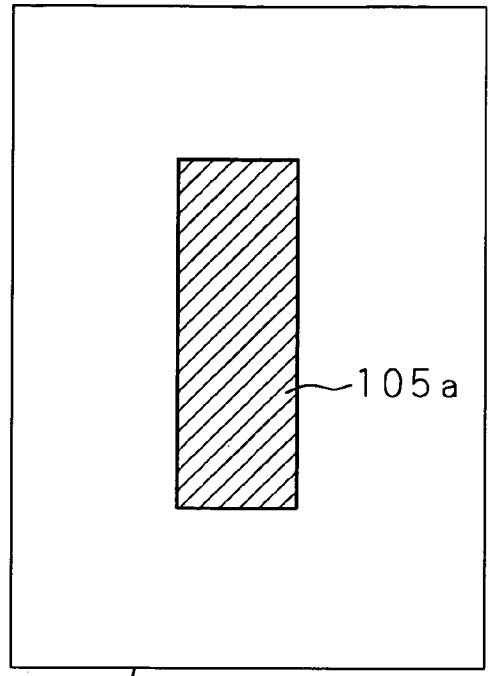
FIRST PAGE FRONTSIDE (PATTERN 1)
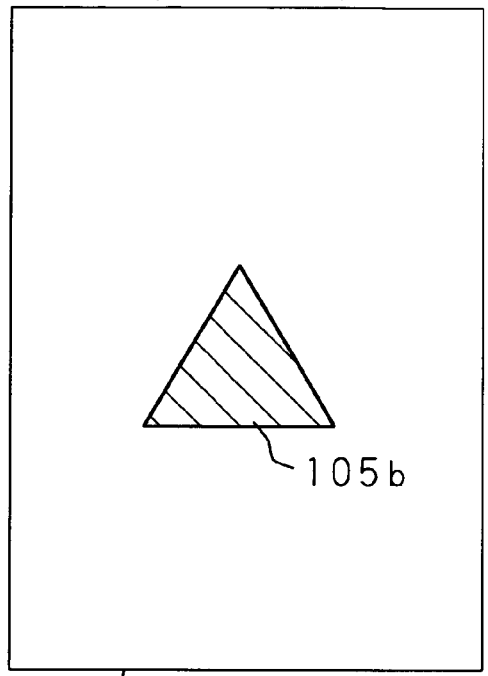
FIRST PAGE BACKSIDE (PATTERN 2)
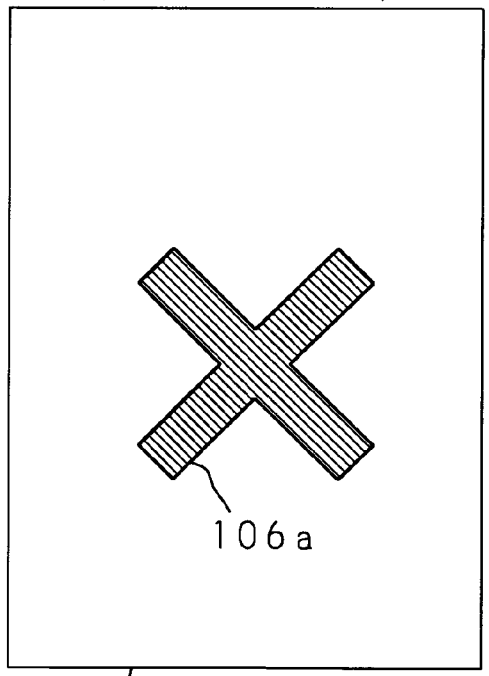
SECOND PAGE FRONTSIDE (DUMMY PATTERN)
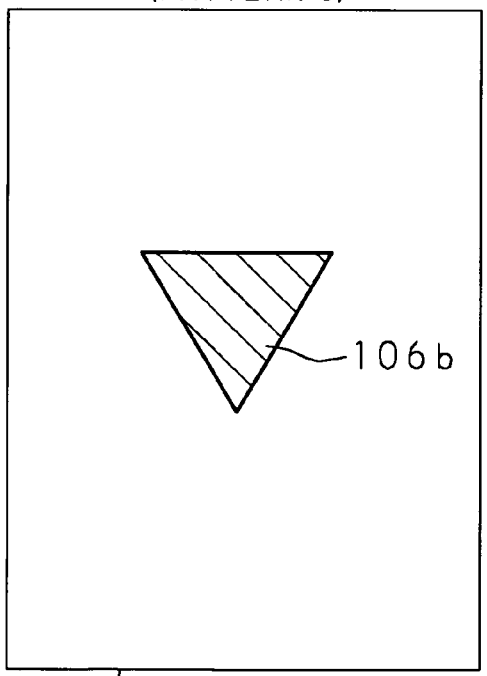
SECOND PAGE BACKSIDE (PATTERN 3)

FIG. 15

| | | Order of Reading | | | |
|---|---|---|---|---|---|
| AUTHORIZED ORDER OF READING | Order of Reading | 1 | 2 | 3 | 4 |
| | Surface of Reading | FIRST PAGE FRONTSIDE | SECOND PAGE BACKSIDE | FIRST PAGE BACKSIDE | |
| UNAUTHORIZED ORDER OF READING 1 | Order of Reading | 1 | 2 | 3 | 4 |
| | Surface of Reading | FIRST PAGE FRONTSIDE | SECOND PAGE BACKSIDE | SECOND PAGE FRONTSIDE | |
| UNAUTHORIZED ORDER OF READING 2 | Order of Reading | 1 | 2 | 3 | 4 |
| | Surface of Reading | FIRST PAGE FRONTSIDE | SECOND PAGE BACKSIDE | SECOND PAGE FRONTSIDE | FIRST PAGE BACKSIDE |

F I G. 2 0
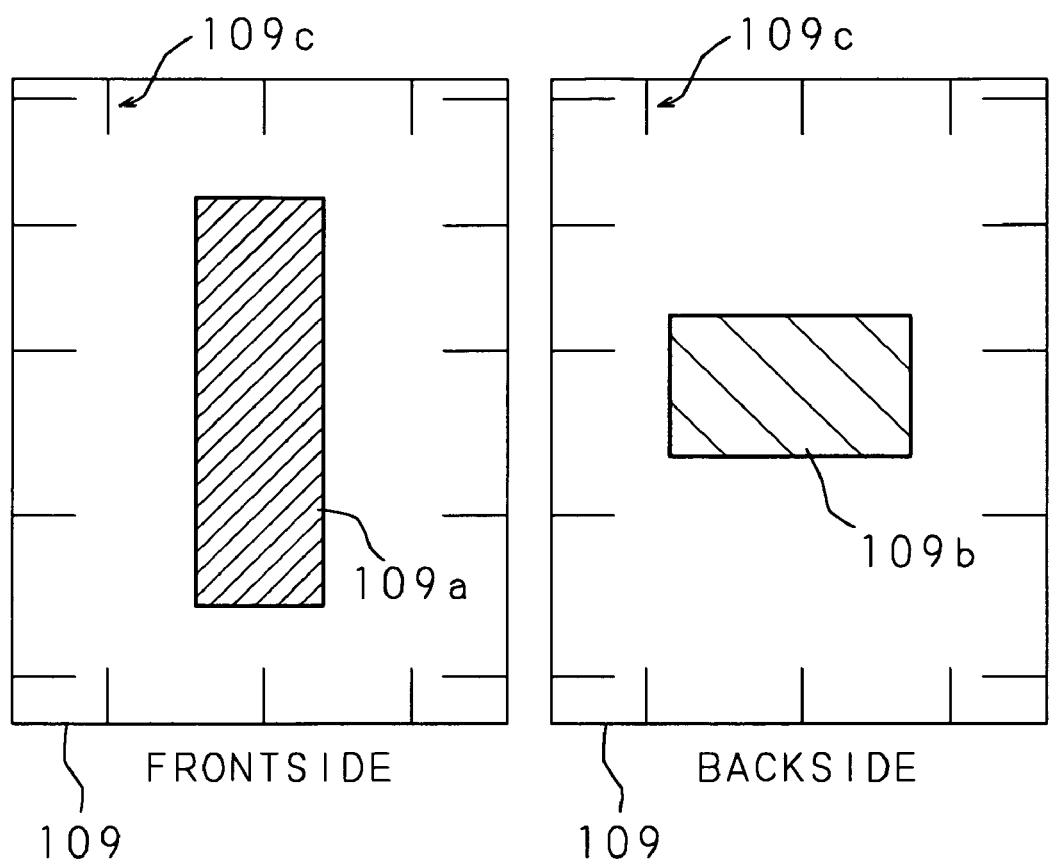

IMAGE READING APPARATUS, IMAGE PROCESSING SYSTEM, AND IMAGE RECORDING APPARATUS

CROSS-REFERENCE TO RELATED APPLICATIONS

This Nonprovisional application claims priority under 35 U.S.C. §119(a) on Patent Application No. 2005-73777 filed in Japan on Mar. 15, 2005, the entire contents of which are hereby incorporated by reference.

BACKGROUND OF THE INVENTION

1. Field of the Invention

The present invention relates to an image reading apparatus and an image processing system in which a plurality of sheets are used in combination so that user authentication or apparatus setting is performed, as well as to an image recording apparatus capable of preparing a sheet used in the image reading apparatus and the image processing system.

2. Description of Related Art

In recent years, combined machines are spreading that are constructed by incorporating a facsimile function into copy machines having a printer function. In such apparatuses, a color copy function, a color facsimile communication function, and the like are also incorporated as an expansion of the printer function. In such multi-function apparatuses, only when various kinds of conditions are set up appropriately, various kinds of functions can effectively be executed with desired conditions.

In the setting of various kinds of setting conditions in an apparatus of this kind, each setting condition is display in a setting screen on an operation panel, so that setting is performed with switching the setting screens sequentially. This requires a rather long working time even when a skilled user performs the setting. Further, necessary key operation is remarkably complicated for an unskilled user not familiar to the operation of the apparatus. Thus, in the prior art, Japanese Patent Application Laid-Open No. 2000-353171 discloses an apparatus in which a format sheet describing various kinds of setting information is read so that character recognition is performed by an OCR (Optical Character Reader) and in which the apparatus setting is then changed into the acquired contents. This apparatus reads a format sheet in which check marks are entered into checking fields corresponding to various kinds of setting conditions, thereby recognizes the checked setting conditions, and then changes the apparatus setting into the recognized contents.

On the other hand, printing systems have been realized in which images based on data of documents, graphics, or the like prepared by an information processing apparatus such as a personal computer are recorded on paper sheets by an image recording apparatus such as a printer and a digital combined machine. Meanwhile, data treated by such information processing apparatuses can include data containing trade secrets. Thus, apparatuses are spreading in which in order that data having such confidentiality should not be leaked out carelessly, each user is authenticated at the time of use so that the use is allowed solely to authorized users.

A frequently used method of authenticating the users is that user IDs and passwords are registered into each apparatus in advance so that authentication is performed on the basis of the determination whether a user ID and a password inputted by each user at the time of use of the apparatus agree with the registered ones. Nevertheless, the user need input the user ID and the password at each time of use of the apparatus. This degrades operability and convenience. Thus, Japanese Patent Application Laid-Open No. 2003-345760 discloses an apparatus that reads a plurality of bar codes in a predetermined order and thereby authenticates a user.

Nevertheless, the apparatus disclosed in Japanese Patent Application Laid-Open No. 2000-353171 has a possibility that the setting information cannot reliably be acquired from the format sheet depending on the accuracy of the OCR. Further, when check marks are entered into the checking fields or alternatively when desired setting information is described in the format sheet, a pen or the like is necessary. This causes the problem of an increase in the time and effort of the user.

Further, in the apparatus that performs various kinds of processing using bar codes as disclosed in Japanese Patent Application Laid-Open No. 2003-345760, a bar code reader for reading the bar codes need be provided separately. Further, when a large number of bar codes are used, the order of reading of the bar codes becomes complicated, and hence increases the work of the user. On the contrary, when a small number of bar codes are used, a problem arises that spoofing by a third party cannot be prevented.

BRIEF SUMMARY OF THE INVENTION

The present invention has been devised in view of these situations. An object of the present invention is to provide an image reading apparatus and an image processing system in which the operation of operation keys by a user is not received while hardware sections necessary for ordinary operation are solely used and in which a combination of patterns provided in a plurality of sheets is detected so that information (processing information) necessary for execution of processing is inputted so that processing is executed on the basis of the inputted information.

Another object of the present invention is to provide an image recording apparatus capable of preparing sheets to be read by an image reading apparatus and an image processing system in which a combination of patterns provided in a plurality of sheets is detected so that information (processing information) necessary for execution of processing is inputted so that processing is executed on the basis of the inputted information.

An image reading apparatus according to the present invention is characterized by an image reading apparatus that comprises: reading means for reading an image recorded on a sheet; detecting means for detecting plural types of patterns from the read image; storing means for storing processing information for use in a processing to be executed, in a manner corresponding to pattern information about a combination of patterns; means for obtaining information about a combination of detected patterns on the basis of a detection result when said detecting means detects a pattern from each of images read from a plurality of sheets; means for searching for the obtained information in the pattern information stored in said storing means; means for reading from said storing means the processing information stored in a manner corresponding to the pattern information, when the pattern information is found by said means; and means for executing said processing using the read processing information.

In the present invention, processing information used in processing to be executed is stored in a manner corresponding to pattern information. Then, when a pattern is detected from each of images read from a plurality of sheets, information concerning the combination of detected patterns is acquired. Then, pattern information that agrees with the acquired information is searched for. Then, processing information corresponding to the agreeing pattern information is read. After that, processing is executed using the processing information. Thus, processing information corresponding to the combination of patterns (that is, the combination of sheets) is inputted so that processing is executed using the processing information.

An image reading apparatus according to the present invention is characterized in that the processing information stored in said storing means is authentication information for a user; and comprising means for authenticating a user by using the authentication information.

In the present invention, authentication information for a user is stored in a manner corresponding to pattern information concerning a combination of patterns. Thus, authentication process is executed when an appropriate combination of a plurality of sheets is used.

An image reading apparatus according to the present invention is characterized in that the processing information stored in said storing means is a set condition about said processing; and comprising means for setting up processing to be executed in accordance with said set condition.

In the present invention, a setting condition concerning processing is stored in a manner corresponding to pattern information concerning a combination of patterns. Thus, setup for processing to be executed is achieved when an appropriate combination of a plurality of sheets is used.

An image reading apparatus according to the present invention is characterized in that the pattern information stored in said storing means is information about types of patterns.

In the present invention, information concerning the kinds of patterns is stored as pattern information. Thus, when the kind of pattern is detected from the image read from each sheet, the combination of patterns provided in these sheets is determined.

An image reading apparatus according to the present invention is characterized in that the pattern information stored in said storing means includes information about a layout of the patterns.

In the present invention, information concerning arrangement relation of patterns is included in the pattern information. Thus, the combination of patterns is determined, for example, on the basis of a method how the sheets are placed on a manuscript table.

An image reading apparatus according to the present invention is characterized in that said reading section reads a plurality of sheets sequentially or simultaneously.

In the present invention, a plurality of sheets are read sequentially or simultaneously. Thus, employable are: a method of use in which one sheet at a time is placed on a manuscript table; and a method of use in which a plurality of sheets are placed simultaneously on a manuscript table.

An image reading apparatus according to the present invention is characterized by comprising: means for judging whether or not the detected pattern is a predetermined pattern; and means for inhibiting execution of said processing, when it is judged that the detected pattern is the predetermined pattern.

In the present invention, when the detected pattern is determined as a predetermined pattern, the execution of processing is inhibited. Thus, a dummy pattern not used in a combination may be included. This permits an increase in the number of combinations of patterns. Further, the execution of processing is inhibited when a predetermined pattern is detected. This nullifies an unauthorized processing request.

The image reading apparatus according to the present invention is characterized by comprising: means for judging whether or not a predetermined combination of patterns is detected, on the basis of the obtained information about the combination of patterns; and means for inhibiting execution of said processing when it is judged that the predetermined combination of patterns is detected.

In the present invention, when the detected pattern is determined as a predetermined pattern, the execution of processing is inhibited. Thus, for example, when the reading of sheets has been executed not in a predetermined order or alternatively when an unexpected pattern has been included in a part of combination, the execution of processing is inhibited. This nullifies an unauthorized processing request.

The image reading apparatus according to the present invention is characterized by comprising: means for receiving processing information and pattern information, and means for storing the two pieces of received information in said storing means in a manner corresponding to each other.

In the present invention, processing information and pattern information are received so that the two received information pieces are stored in a manner corresponding to each other. This permits the registration of information inputted in correspondence to a new combination of sheets (a combination of patterns).

An image processing system according to the present invention is characterized by an image processing system comprising: an image reading apparatus for reading an image recorded on a sheet; and an image processing apparatus for detecting plural types of patterns from the image read by the image reading apparatus and then executing processing in accordance with the detected result, wherein said image processing apparatus comprises: storing means for storing processing information for use in a processing to be executed, in a manner corresponding to pattern information about a combination of patterns; means for obtaining information about a combination of detected patterns based on a detection result when a pattern is detected from each of images read from a plurality of sheets; means for searching for the obtained information in the pattern information stored in said storing means; means for reading from said storing means the processing information stored in a manner corresponding to the pattern information, when the pattern information is found by said means; and means for executing said processing using the read processing information.

In the present invention, the image processing apparatus detects a pattern on the basis of the image read by the image reading apparatus, then acquires information concerning the combination of detected patterns, then searches for pattern information agreeing with the acquired information, then reads processing information corresponding to the agreeing pattern information, and then executes processing is executed using the processing information. Thus, even when an ordinary scanner is used, information input can be achieved using a plurality of sheets.

An image processing system according to the present invention is characterized by an image processing system comprising: an image reading apparatus; and an information transmitting apparatus, wherein said image reading apparatus comprises: reading means for reading an image recorded on a sheet; means for detecting a pattern in each of images read from a plurality of sheets; means for obtaining information about a combination of detected patterns; and means for transmitting the obtained information to said information transmitting apparatus, and wherein said information transmitting apparatus comprises: storing means for storing processing information for use in a processing to be executed, in a manner corresponding to pattern information about a combination of patterns; means for receiving the information transmitted from said image reading apparatus; means for searching for the received information in the pattern information stored in said storing means; and means for transmitting to said image reading apparatus the processing information stored in a manner corresponding to the pattern information, when the pattern information is found.

In the present invention, in the image reading apparatus, images are read from a plurality of sheets. Then, information concerning a combination of patterns is acquired from the images of the sheets. Then, the acquired information is transmitted to the information transmitting apparatus. Further, in the information transmitting apparatus, pattern information is searched on the basis of the received information. Then, when processing information corresponding to the agreeing pattern information is present, the processing information is transmitted to the image reading apparatus. Thus, the processing information need not be managed in the image reading apparatus. Accordingly, for example, when an authentication server is provided separately, user authentication can be performed. Further, even when a plurality of image reading apparatuses are present on a communication network, the processing information can be managed integrally in the information transmitting apparatus.

An image recording apparatus according to the present invention is characterized by comprising: the image reading apparatus according to any one of the present inventions described above; and means for recording the image read by the image reading apparatus on a sheet.

In the present invention, provided are: the above-mentioned image reading apparatus; and means for recording on a sheet the image read by the image reading apparatus. Thus, the present invention is applicable to a copy machine, a digital combined machine, and the like.

An image recording apparatus according to the present invention is characterized by comprising means for receiving image data; and means for recording an image on a sheet based on the image data received by said means.

In the present invention, provided are: means for receiving image data; and means for recording an image on a sheet on the basis of the received image data. Thus, the present invention is applicable to a printer, a digital combined machine, and the like.

An image recording apparatus according to the present invention is characterized by an image recording apparatus for recording a pattern on a sheet so as to prepare a sheet to be read by the image reading apparatus according to any one of the present inventions described above, wherein said image recording apparatus comprises: storing means for storing processing information to be used when predetermined processing is executed, in a manner corresponding to pattern information about a combination of patterns; means for receiving processing information; means for reading from said storing means the pattern information stored in a manner corresponding to the received processing information; and means for recording a pattern on a sheet in accordance with the read pattern information.

In the present invention, when processing information to be used in the execution of predetermined processing is received, pattern information concerning a combination of patterns is read from the storing means. Then, a pattern is recorded on a sheet in accordance with the read-out pattern information. Thus, a sheet is prepared that is used for inputting authentication information used at the time of executing authentication process or alternatively a setting condition used at the time of executing setup process.

An image recording apparatus according to the present invention is characterized by an image recording apparatus for recording a pattern on a sheet so as to prepare a sheet to be read by the image reading apparatus according to any one of the present inventions described above, wherein said image recording apparatus comprises: means for setting up processing information to be used when predetermined processing is executed; means for generating pattern information about a combination of patterns in a manner corresponding to said processing information when said processing information is set up; and means for recording a pattern on a sheet in accordance with the generated pattern information.

In the present invention, when processing information to be used in the execution of predetermined processing is set up, pattern information concerning a combination of patterns is generated in accordance with said processing information. Then, a pattern is recorded on a sheet in accordance with the generated pattern information. Thus, a sheet is prepared that is used for inputting authentication information used at the time of executing authentication process or alternatively a setting condition used at the time of executing setup process.

An image recording apparatus according to the present invention is characterized in that the processing information is authentication information for a user.

In the present invention, authentication information of a user is set up as processing information. Thus, a plurality of sheets are prepared that are used in combination in user authentication.

An image recording apparatus according to the present invention is characterized in that the processing information is a set condition about said processing.

In the present invention, a setting condition for processing is set up as processing information. Thus, a plurality of sheets are prepared that are used in combination in setting up the processing.

An image recording apparatus according to the present invention is characterized in that said pattern is recorded in fine patterns or invisible ink.

In the present invention, a part of patterns are recorded in fine patterns or invisible ink. This prevents easy duplication of the sheets used for authentication and the sheets used for setting.

An image recording apparatus according to the present invention, wherein information about a method of use of a sheet is recorded on said sheet.

In the present invention, means is provided for recording information concerning a method of use of a sheet to be prepared. This allows a user to perform authentication process, setup process, and the like without a mistake in the usage procedure.

An image recording apparatus according to the present invention is characterized by comprising means for providing information about a method of use of a sheet to be prepared.

In the present invention, information concerning a method of use of a sheet is reported. Thus, a person who could know the information can solely perform authentication process, setup process, and the like appropriately.

According to the present invention, processing information used in processing to be executed is stored in a manner corresponding to pattern information. Then, when a pattern is detected from each of images read from a plurality of sheets, information concerning the combination of detected patterns is acquired. Then, pattern information that agrees with the acquired information is searched for. Then, processing information corresponding to the agreeing pattern information is read. After that, processing is executed using the processing information. Thus, a plurality of sheets are used in combination so that information input can be performed. Accordingly, when a setting value (processing information) is assigned in advance to a predetermined key operation, the setting value can be inputted easily without complicated key operation. Further, a person who can know the combination of sheets can solely input the setting value. Thus, a remarkable effect is obtained in processing that requires the consideration of confidentiality such as in authentication process for a user.

According to the present invention, authentication information for a user is stored in a manner corresponding to pattern information concerning a combination of patterns. Thus, authentication process can be executed when an appropriate combination of a plurality of sheets is used.

According to the present invention, a setting condition concerning processing is stored in a manner corresponding to pattern information concerning a combination of patterns. Thus, setup for processing to be executed is achieved when an appropriate combination of a plurality of sheets is used.

According to the present invention, information concerning the kinds of patterns is stored as pattern information. Thus, when the kind of pattern is detected from the image read from each sheet, the combination of patterns provided in these sheets is determined.

According to the present invention, information concerning arrangement relation of patterns is included in the pattern information. Thus, for example, the combination of patterns can be defined on the basis of a method how the sheets are placed on a manuscript table.

According to the present invention, a plurality of sheets are read sequentially or simultaneously. Thus, employable are: a method of use in which one sheet at a time is placed on a manuscript table; and a method of use in which a plurality of sheets are placed simultaneously on a manuscript table.

According to the present invention, when a detected pattern is determined as a predetermined pattern, the execution of processing is inhibited. Thus, a dummy pattern not used in a combination may be included. This permits an increase in the number of combinations of patterns. Thus, unauthorized use of the sheets can be prevented in advance. Further, the execution of processing is inhibited when a predetermined pattern is detected. This nullifies an unauthorized processing request.

According to the present invention, when a detected pattern is determined as a predetermined pattern, the execution of processing is inhibited. Thus, for example, when the reading of sheets has been executed not in a predetermined order or alternatively when an unexpected pattern has been included in a part of combination, the execution of processing is inhibited. This nullifies an unauthorized processing request.

According to the present invention, processing information and pattern information are received so that the two received information pieces are stored in a manner corresponding to each other. This permits the registration of information inputted in correspondence to a new combination of sheets (a combination of patterns).

According to the present invention, the image processing apparatus detects a pattern on the basis of an image read by the image reading apparatus, then acquires information concerning the combination of detected patterns, then searches for pattern information agreeing with the acquired information, then reads processing information corresponding to the agreeing pattern information, and then executes processing using the processing information. Thus, even when an ordinary scanner is used, information input can be achieved using a plurality of sheets.

According to the present invention, in the image reading apparatus, images are read from a plurality of sheets. Then, information concerning a combination of patterns is acquired from the images of the sheets. Then, the acquired information is transmitted to the information transmitting apparatus. Further, in the information transmitting apparatus, pattern information is searched on the basis of the received information. Then, when processing information corresponding to the agreeing pattern information is present, the processing information is transmitted to the image reading apparatus. Thus, the processing information need not be managed in the image reading apparatus. Accordingly, for example, when an authentication server is provided separately, user authentication can be performed. Further, even when a plurality of image reading apparatuses are present on a communication network, the processing information can be managed integrally in the information transmitting apparatus.

According to the present invention, provided are: the above-mentioned image reading apparatus; and means for recording on a sheet the image read by the image reading apparatus. Thus, the present invention is applicable to a copy machine, a digital combined machine, and the like.

According to the present invention, provided are: means for receiving image data; and means for recording an image on a sheet on the basis of the received image data. Thus, the present invention is applicable to a printer, a digital combined machine, and the like.

According to the present invention, when processing information to be used in the execution of predetermined processing is received, pattern information concerning a combination of patterns is read from the storing means. Then, a pattern is recorded on a sheet in accordance with the read-out pattern information. Thus, a plurality of sheets can be prepared that are used for inputting authentication information used at the time of executing authentication process or alternatively a setting condition used at the time of executing setup process.

According to the present invention, when processing information to be used in the execution of predetermined processing is set up, pattern information concerning a combination of patterns is generated in a manner corresponding to said processing information. Then, a pattern is recorded on a sheet in accordance with the generated pattern information. Thus, a plurality of sheets can be prepared that are used for inputting authentication information used at the time of executing authentication process or alternatively a setting condition used at the time of executing setup process.

According to the present invention, authentication information of a user is set up as processing information. Thus, a plurality of sheets are prepared that are used in combination in user authentication.

According to the present invention, a setting condition for processing is set up as processing information. Thus, a plurality of sheets are prepared that are used in combination in setting up the processing.

According to the present invention, a part of patterns are recorded in fine patterns or invisible ink. This prevents easy duplication of the sheets used for authentication and the sheets used for setting. Thus, unauthorized use of the sheets can be prevented in advance.

According to the present invention, means is provided for recording information concerning a method of use of a sheet to be prepared. This allows a user to perform authentication process, setup process, and the like without a mistake in the usage procedure.

According to the present invention, information concerning a method of use of a sheet is reported. Thus, a person who could know the information can solely perform authentication process, setup process, and the like appropriately.

The above and further objects and features of the invention will more fully be apparent from the following detailed description with accompanying drawings.

BRIEF DESCRIPTION OF THE SEVERAL VIEWS OF THE DRAWINGS

FIG. 2 is a schematic diagram showing an example of authentication sheets;

FIGS. 3A and 3B are schematic diagrams showing a reading procedure for authentication sheets;

FIGS. 5A to 5C are schematic diagrams showing an example of screens displayed on a display section of a user interface;

FIG. 6 is a conceptual diagram showing contents stored in an authentication code management table;

FIG. 7 is a conceptual diagram showing contents stored in a setting condition management table;

FIG. 8 is a conceptual diagram showing another example of contents stored in an authentication code management table;

FIG. 14 is a schematic diagram showing an example of authentication sheets;

FIG. 15 is a diagram describing the order of reading of authentication sheets;

FIG. 20 is a schematic diagram showing another example of an authentication sheet;

DETAILED DESCRIPTION OF THE INVENTION

A mode in which an image reading apparatus and an image recording apparatus according to the present invention are applied to a digital combined machine is described below in detail with reference to the drawings.

Embodiment 1

Figure 1:
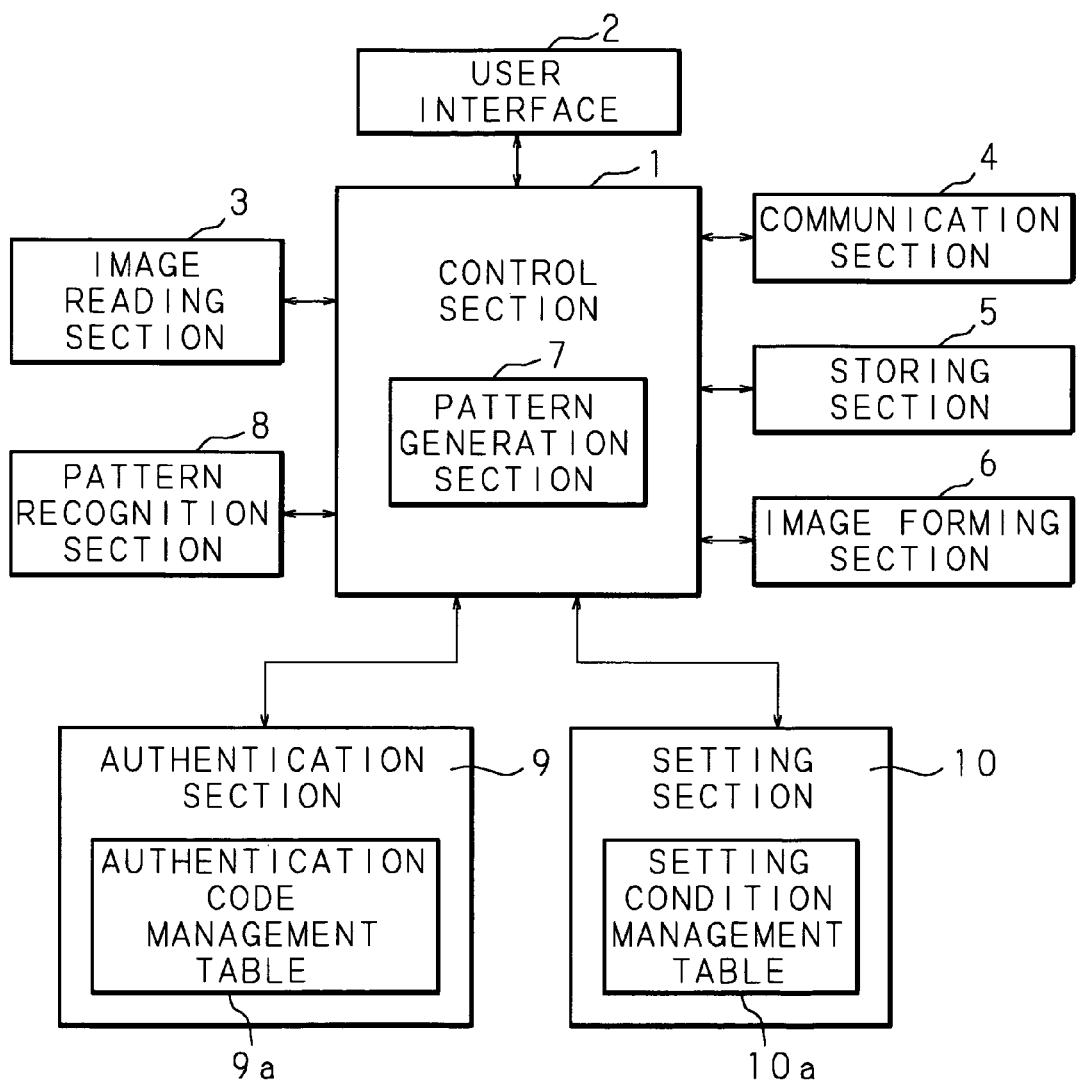
FIG. 1 is a block diagram showing the internal configuration of a digital combined machine according to the present invention.

FIG. 1 is a block diagram showing the internal configuration of a digital combined machine according to the present embodiment. The digital combined machine according to the present embodiment includes a control section 1 that is composed of a CPU (Central Processing Unit) or an MPU (Micro Processor Unit) for performing various kinds of arithmetic processing and thereby serves as a control center. The control section 1 is connected to a user interface 2, an image reading section 3, a communication section 4, a storing section 5, an image forming section 6, a pattern recognition section 8, an authentication section 9, a setting section 10, and the like. The control section 1 controls the operation of these hardware sections.

The control section 1 includes: a ROM for storing in advance a control program specifying its own control procedure; and a RAM for temporarily storing various data generated during the execution of the control program. When the control section 1 appropriately loads onto the RAM the control program stored in the ROM and then executes the program, the entire apparatus operates as an image reading apparatus and an image recording apparatus according to the present invention.

The user interface 2 is composed specifically of an operation panel serving as a touch panel, and comprises: an operation section for receiving operation instructions from a user; and a display section for displaying information to be reported to a user. The operation section includes various kinds of manual operation buttons for receiving operation instructions from a user. The operation instructions received from a user include: setting values for various functions such as the number of sheets to be printed and the copy density; switching operations for various functions; and execution start instructions for various kinds of process. The display section is provided with a liquid crystal display, and thereby displays: the operation situation of the apparatus; various kinds of setting values inputted through the operation section; and information to be reported to a user.

The image reading section 3 comprises: a glass-fabricated manuscript table 100 (see FIG. 3) on which a manuscript to be read is placed; a light source for projecting light onto the manuscript on the manuscript table 100; an image sensor composed of a CCD (Charge Coupled Device) or the like; an AD converter; and the like. Thus, the image of a manuscript located at a predetermined reading position is formed on the image sensor, so that the image is converted into an analog electric signal. Then, the acquired analog electric signal is AD-converted by the AD converter. After that, the image reading section 3 performs correction on the digital signal acquired by AD conversion, with taking into consideration the orientation property of the light source at the time of manuscript reading, sensitivity inhomogeneity of the image sensor, and the like, and thereby generates image data of digital format.

The communication section 4 comprises: a network interface for communicating with an external apparatus such as a personal computer; and a facsimile communication interface for performing facsimile communication with an external facsimile machine. After communication connection is established between an external apparatus and the network interface, the communication section 4 receives a print job transmitted from the external apparatus, and transmits information to be notified to the external apparatus. Here, the print job received by the communication section 4 is expanded into image data of bit map format in accordance with the PDL (Page Description Language) describing the print job. Further, in the facsimile communication interface, when facsimile data transmitted from an external facsimile machine is received, the facsimile data is decoded so that image data of bit map format is acquired. Alternatively, data to be transmitted to the outside is coded so that facsimile data is generated. This facsimile data is transmitted to an external facsimile machine according to a predetermined procedure.

Here, the present embodiment has been described for the case that both of a network interface and a facsimile modem are provided. However, any one of these may solely be provided.

The storing section 5 is composed of an HDD device or the like, and stores: image data acquired by the image reading section 3; image data expanded from the data received by the communication section 4; and the like. When a request is received through the user interface 2 or alternatively when a request from an external apparatus is received through the communication section 4, the stored data is read. Thus, when output process need be re-executed because of an insufficient number of outputted copies, failure in the output process, or the like, the image data stored in the storing section 5 can be read so that the output process can be re-executed.

The image forming section 6 records an image on a paper sheet on the basis of the image data acquired by the image reading section 3 or the image data expanded from the data received by the communication section 4. For the purpose of this, the image forming section 6 comprises: an electrostatic charger for electrostatically charging a photosensitive drum at a predetermined potential; a laser writing unit for emitting laser light according to image data received from the outside, and thereby generating an electrostatic latent image on the photosensitive drum; a developer for supplying toner to the electrostatic latent image formed on the photosensitive drum surface and thereby causing the latent image to be visible; a transfer unit for transferring the toner image formed on the photosensitive drum surface onto a paper sheet; and the like (not shown). Thus, the image forming section 6 records an image desired by a user onto a paper sheet by electrophotography. Here, methods employable in place of the electrophotography using a laser writing unit include an inkjet method, a heat transfer method, a sublimation method.

In the present embodiment, sheets used when authentication process for a user is performed (referred to as authentication sheets, hereafter) and sheets used when various kinds of setting is performed (referred to as setting sheets, hereafter) can be prepared. For the purpose of this, the digital combined machine includes the pattern generation section 7 for generating various kinds of patterns. Then, generated patterns are recorded on paper sheets so that authentication sheets and setting sheets are prepared. The present embodiment is characterized in that when authentication process (or setup process) is performed, a plurality of authentication sheets (or setting sheets) prepared by the present digital combined machine are used in combination. When the authentication sheets are prepared, the correspondence between the patterns recorded on the authentication sheets and the authentication information (an authentication code) is stored into an authentication code management table 9a in the authentication section 9. Similarly, when the setting sheets are prepared, the correspondence between the patterns recorded on the setting sheets and the information concerning the setting condition is stored into a setting condition management table 10a in the setting section 10.

When authentication is performed using the authentication sheets prepared as described here, a plurality of authentication sheets are read sequentially or simultaneously by the image reading section 3. Here, a method of use of the authentication sheets are specified by the digital combined machine and notified to the user at the time of preparation of the authentication sheets. According to the notified information, the user arranges the authentication sheets on the manuscript table 100, or alternatively executes reading process with considering the order. The images of the authentication sheets read by the image reading section 3 are transferred to the pattern recognition section 8. Then, the pattern recognition section 8 detects patterns included in the images. The detection of the patterns may be performed using a technique of pattern matching. Then, on the basis of the detected patterns, the combination of patterns provided in the authentication sheets is determined. After that, it is determined whether information that agrees with this combination is included in the authentication code management table 9a, so that authentication process is executed.

setup process using the setting sheets is performed similarly. That is, according to the information notified from the digital combined machine at the time of preparation of the setting sheets, a user arranges the setting sheets on the manuscript table 100, or alternatively executes reading process with considering the order. Then, patterns are detected from the images read from the setting sheets. Then, a setting condition corresponding to the combination of detected patterns is read from the setting condition management table 10a. After that, the control section 1 sets up the hardware sections in accordance with the setting condition read from the setting condition management table 10a.

FIG. 2 is a schematic diagram showing an example of authentication sheets. In the example shown in FIG. 2, two authentication sheets 101 and 102 are expected to be used in combination. In the frontside of the first authentication sheet 101, an indicator 101a is recorded that specifies a method of placement on the manuscript table 100. In the backside, a pattern 101b is recorded that has been generated by the pattern generation section 7. The indicator 101a is composed of an arrow mark of open face. This indicator 101a indicates that this surface is the frontside of the first authentication sheet 101 and that the sheet should be placed in a state that the arrow directs the far side of the manuscript table 100. Further, the pattern 101b is composed of a rectangle provided with an appropriate pattern or color. Then, when the image reading section 3 reads the surface provided with this pattern 101b, the pattern recognition section 8 detects the pattern 101b.

The second authentication sheet 102 is processed similarly. That is, in the frontside of the second authentication sheet 102, an indicator 102a is recorded that specifies a method of placement on the manuscript table 100. In the backside, a pattern 102b is recorded that has been generated by the pattern generation section 7. The indicator 102a is composed of an arrow mark which is similar to the indicator 101a but has different pattern, color, or the like in the inside. This permits discrimination from the indicator 101a. Further, the pattern 102b is composed of a triangle provided with an appropriate pattern or color. Then, when the image reading section 3 reads the surface provided with this pattern 102b, the pattern recognition section 8 detects the pattern 102b.

Here, a figure of rectangle has been recorded as the pattern 101b in the first authentication sheet 101, while a figure of triangle has been recorded as the pattern 102b in the second authentication sheet 102. However, patterns to be recorded on the authentication sheets 101 and 102 are not necessarily limited to these figures. A combination of arbitrary figures may be employed. Further, even when the same geometrical figures are employed, their internal patterns or colors may be different from each other such that two kinds of patterns should be obtained. Furthermore, patterns to be recorded on the authentication sheets 101 and 102 are not necessarily limited to geometrical figures. Employable are bar codes, two-dimensional bar codes, arbitrary character strings, appropriate images, and combinations of these. In the present embodiment, these figures, bar codes, two-dimensional bar codes, arbitrary character strings, appropriate images, and combinations of these to be recorded on the authentication sheets or the setting sheets are generically referred to as patterns.

FIGS. 3A and 3B are schematic diagrams showing a reading procedure for the authentication sheets 101 and 102. FIGS. 3A and 3B show a situation that reading of the two authentication sheets 101 and 102 is executed in two separate steps. That is, with referring to the indicator 101a recorded on the first authentication sheet, the user places the authentication sheet 101 in a predetermined orientation on the manuscript table 100, and then executes reading process for the pattern 101b recorded on the backside. After the reading process for the first authentication sheet 101 is completed, the user removes the authentication sheet 101 from the manuscript table 100, then similarly places the second authentication sheet 102, and then executes reading process for the pattern 102b recorded on the backside. As such, when the authentication sheets 101 and 102 are read sequentially so that the patterns are detected, information concerning the combination of patterns is acquired. The control section 1 of the digital combined machine searches the authentication code management table 9a on the basis of this information, and thereby executes authentication process.

Here, in the present embodiment, the combination of patterns is determined with taking into consideration the order of reading of patterns. That is, a combination generated when the pattern 101b and the pattern 102b are read in this order is discriminated from a combination generated when the pattern 102b and the pattern 101b are read in this order.

FIG. 3B shows a situation that the two authentication sheets 101 and 102 are placed on the manuscript table 100 in a manner aligned with each other so that the patterns 101b and 102b recorded on the authentication sheets 101 and 102 are read simultaneously. At that time, the user places the two authentication sheets 101 and 102 on the manuscript table 100 in a predetermined arrangement relation, and then executes reading process. As such, when the authentication sheets 101 and 102 are read simultaneously so that the patterns are detected, information concerning the combination of patterns is acquired. The control section 1 of the digital combined machine searches the authentication code management table 9a on the basis of this information, and thereby executes authentication process.

Here, even when reading process is performed in a state that the two authentication sheets 101 and 102 are placed on the manuscript table 100 in a manner aligned with each other, the image reading section 3 performs reading process with moving the light source from one end side to the other end side of the manuscript table 100. Thus, in the example shown in FIG. 3B, for example, the pattern 101b is detected first while the pattern 102b is detected next. Accordingly, even when reading is performed simultaneously, the combination of patterns is determined with taking into consideration the order of reading of patterns, similarly to the above-mentioned case.

Here, FIG. 2 has shown an example authentication sheets, while FIGS. 3A and 3B have described a reading procedure for the authentication sheets 101 and 102. However, the situation is similar to the setting sheets and the reading procedure for setting sheets.

Figure 4A:
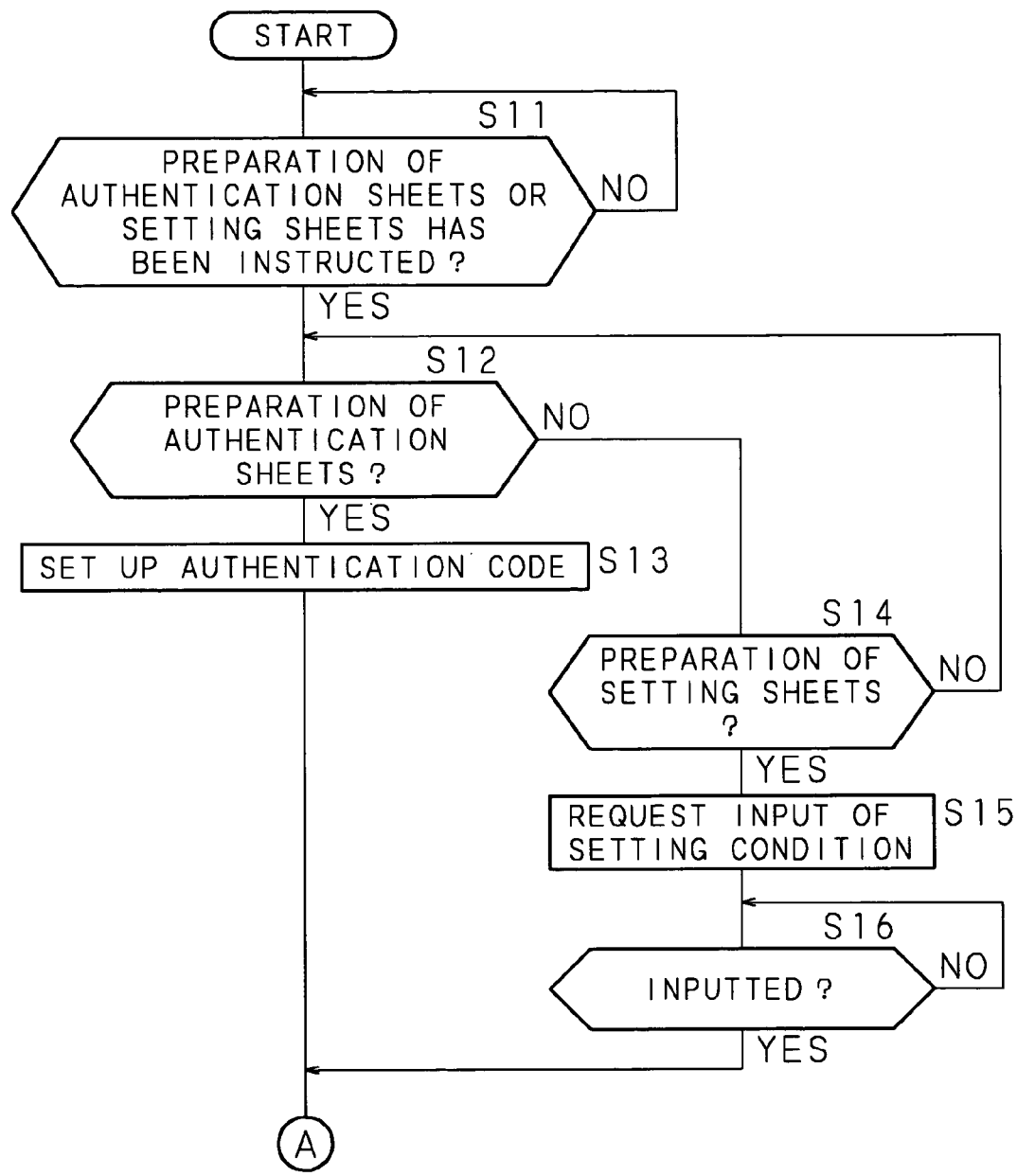
FIGS. 4A and 4B are flow charts describing a procedure of processing executed by a digital combined machine when authentication sheets or setting sheets are prepared.
Figure 4B:
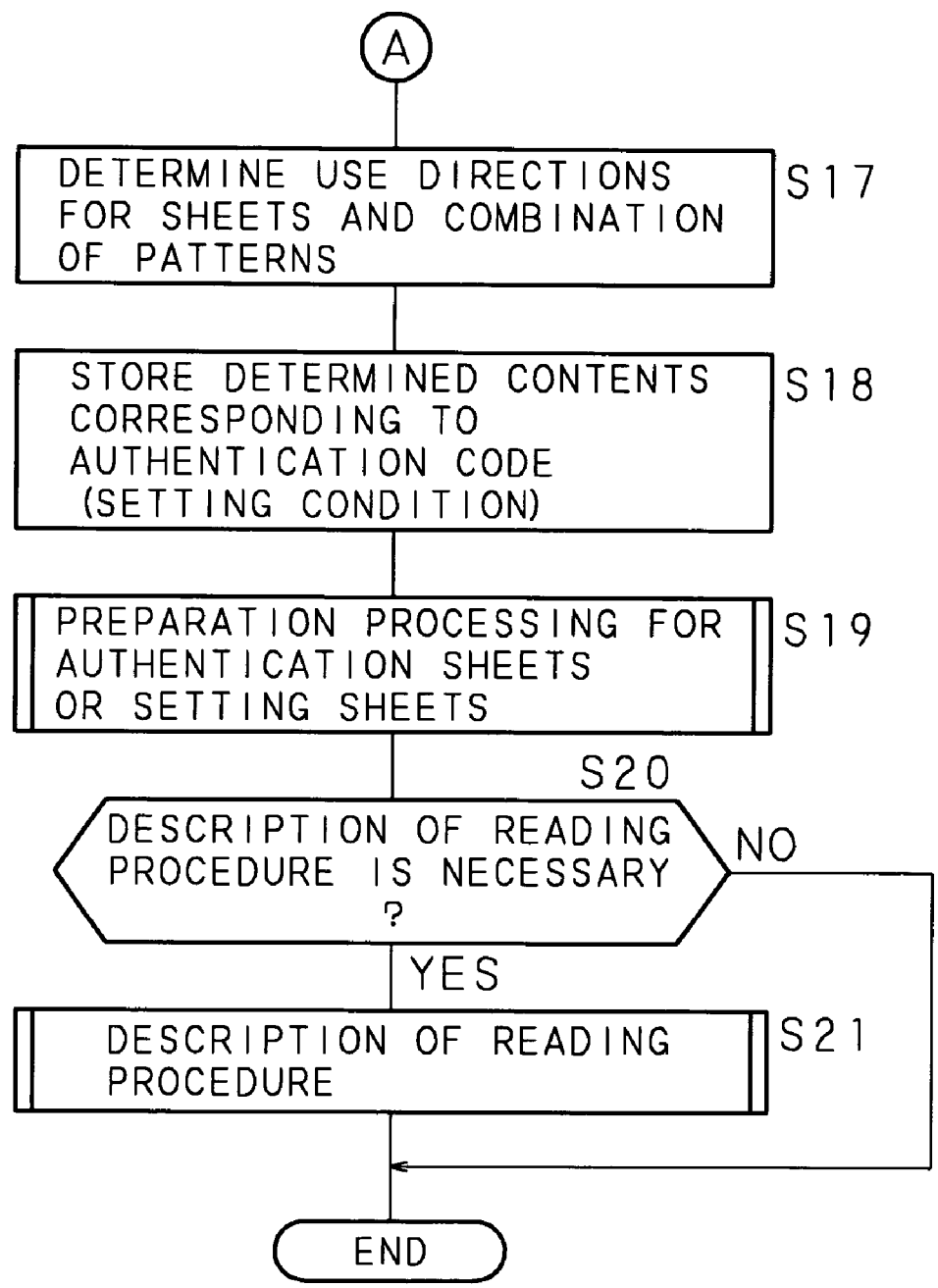

A preparation procedure for authentication sheets or setting sheets is described below. FIGS. 4A and 4B are flow charts describing a procedure of processing executed by the digital combined machine when authentication sheets or setup sheets are prepared. On the basis of information inputted through the user interface 2, first, the control section 1 of the digital combined machine determines whether preparation of authentication sheets or setting sheets has been instructed (step S11). In the present embodiment, a predetermined operation in the user interface 2 invokes a preparation screen for authentication sheets or setting sheets. FIGS. 5A to 5C are schematic diagrams showing an example of screens displayed on the display section of the user interface 2. FIG. 5A shows an example of a preparation screen 210 displayed when authentication sheets or setting sheets are to be prepared. In this preparation screen 210, selection buttons 211 and 212 for receiving the selection of format to be prepared are arranged in the middle of the screen. Further, an execution button 213 for receiving a preparation instruction and a cancel button 214 for receiving a preparation cancel are arranged in a lower part of the screen. After the selection of the preparation of authentication sheets or the preparation of setting sheets performed in this preparation screen 210, when the execution button 213 is pressed, the preparation of the selected kind of format sheets is executed.

When the selection button 212 is pressed in the preparation screen 210, a preparation screen 220 for setting sheets is displayed on the display section of the user interface 2 (see FIG. 5B). In this preparation screen 220, selection buttons 221 and 222 for selecting a function to be set up is arranged in the middle of the screen. Further, a confirmation button 223 for confirming the setting and a cancel button 224 for canceling the setting are arranged in a lower part of the screen.

When the selection button 221 is pressed in the preparation screen 220, an input screen 230 for inputting a setting condition (group) concerning the copy function is displayed on the display section of the user interface 2 (see FIG. 5C). In this input screen 230, an input field 231 for inputting a copy density, an input field 232 for inputting a copy magnification factor, and an input field 233 for inputting the number of copies are arranged in the middle of the screen. A confirmation button 235 for confirming the setting values in the input fields 231-233 and a cancel button 236 for canceling the input of the setting values are arranged in a side part of the screen. Here, numerical input to the input fields 231-233 is performed using a numeric keypad or the like provided in the operation section of the user interface 2.

When it is determined that preparation of authentication sheets or setting sheets is not instructed (S11: NO), a preparation instruction is awaited. Further, when it is determined that preparation of authentication sheets or setting sheets has been instructed through the screens 210-230 shown in FIGS. 5A to 5C (S11: YES), the control section 1 determines whether preparation of authentication sheets has been instructed in the preparation screen 210 (step S12).

When it is determined that preparation of authentication sheets has been instructed (S12: YES), the control section 1 sets up an authentication code (step S13). Here, the authentication code indicates a code assigned to each user for the purpose of authentication of the user (for example, a numerical value of four digits). In the present embodiment, the authentication code is automatically generated by the control section 1 in the digital combined machine. After the setting of the authentication code, the control section 1 determines a method of use of the format sheets (authentication sheets) and the combination of patterns (step S17), and then stores the determined contents into the authentication code management table 9a in a manner corresponding to the authentication code (step S18). Here, as for the combination of patterns, as long as no duplicated combination is registered in both of the authentication code management table 9a and the setting condition management table 10a, the control section 1 may determine an arbitrary combination.

FIG. 6 is a conceptual diagram showing contents stored in the authentication code management table 9a. In the authentication code management table 9a, the authentication code set up by the control section 1 and information concerning the combination of patterns are stored in a manner corresponding to each other. For example, a combination of a quadrangle pattern and a triangle pattern is stored in a manner corresponding to an authentication code "0001". The situation is similar to an authentication code "0002". However, the order of combination of patterns differs from the combination for the authentication code "0001". As for an authentication code "0003", two quadrangles having different colors (or patterns) to each other are stored as a combination of patterns. Here, the authentication code management table 9a need not necessarily store geometrical figures themselves, and may store information specifying the features of figures, the location of storage of figure data, or the like.

Further, the present embodiment has been described for the case that when the authentication sheets are prepared, the control section 1 automatically sets up the authentication code and then determines a combination of patterns in a manner corresponding to the authentication code. However, authentication codes and information concerning combinations of patterns may be stored in advance in the authentication code management table 9a. Then, when preparation of authentication sheets is instructed, the user may be requested to input an authentication code. In this case, with referring to the inputted authentication code, the control section 1 reads corresponding information from the authentication code management table 9a, and thereby determines a combination of patterns to be recorded on the authentication sheets.

At step S12, when it is determined that preparation of authentication sheets or setting sheets is not instructed (S12: NO), the control section 1 determines whether preparation of setting sheets has been instructed in the preparation screen 210 (step S14). When it is determined that preparation of setting sheets is not instructed (S14: NO), the control section 1 returns the processing to step S12.

Further, when it is determined that preparation of setting sheets has been instructed (S14: YES), the control section 1 displays the preparation screen 220, the input screen 230, and the like on the display section of the user interface 2, and thereby requests the input of a setting condition (step S15). Then, the control section 1 determines whether a setting condition is inputted through these screens 220, 230, and the like (step S16). When it is determined that a setting condition is not inputted (S16: NO), input of a setting condition is awaited.

When it is determined that a setting condition has been inputted (S16: YES), the control section 1 determines a method of use of the format sheets (setting sheets) and a combination of patterns (step S17), and then stores the determined contents into the setting condition management table 10a in a manner corresponding to the setting condition (step S18). Here, as for the combination of patterns, as long as no duplicated combination is registered in both of the authentication code management table 9a and the setting condition management table 10a, the control section 1 may determine an arbitrary combination.

FIG. 7 is a conceptual diagram showing contents stored in the setting condition management table 10a. In the setting condition management table 10a, a setting condition inputted through the input screen 230 or the like and information concerning a combination of patterns are stored in a manner corresponding to each other. For example, the first record specifies "a copy density of 100%, a magnification factor of 95%, and eight copies" as a setting condition (group) concerning the copy function. Then, in correspondence to this setting condition, a combination is stored that is composed of a quadrangle pattern and a pattern of two quadrangles. The second record is similar and specifies "a copy density of 100%, a magnification factor of 120%, and one copy" as a setting condition concerning the copy function. Then, in correspondence to this setting condition, a combination is stored that is composed of a triangle pattern and a circle pattern. The third record specifies that the phone number of a transmission destination is "06-○○○○-xxxx", which serves as a setting condition concerning image transmission. Then, in correspondence to this setting condition, a combination is stored that is composed of a quadrangle pattern and a triangle pattern. Here, the setting condition management table 10a need not necessarily store geometrical figures themselves, and may store information specifying the features of figures, the location of storage of figure data, or the like.

Here, in the authentication code management table 9a shown in FIG. 6 and the setting condition management table 10a shown in FIG. 7, information concerning a combination of patterns has been stored in a manner corresponding to the authentication code and the setting condition, respectively. However, in place of a combination of patterns, arrangement relation of two format sheets may be employed. FIG. 8 is a conceptual diagram showing another example of contents stored in the authentication code management table 9a. In the example shown in FIG. 8, a pattern in which two format sheets are aligned horizontally on the manuscript table 100 is stored in a manner corresponding to an authentication code "0001". Further, a pattern in which one format sheet is arranged vertically while the other format sheet is arranged horizontally is stored in a manner corresponding to an authentication code "0002". Furthermore, a pattern in which two format sheets partly overlap with each other vertically is stored in a manner corresponding to an authentication code "0003". Here, the authentication code management table 9a need not necessarily store an image showing the arrangement relation, and may store the center coordinates, the coordinates of the four corners, and the like of the image corresponding to each format sheet.

The following description returns to the flow chart of FIG. 4. After the information is stored into the authentication code management table 9a or the setting condition management table 10a at step S18, the control section 1 executes preparation process for authentication sheets or setting sheets (step S19). In the present embodiment, the pattern generation section 7 generates patterns to be recorded on the format sheets in accordance with the combination of patterns determined at step S17. Then, the generated patterns are transferred to the image forming section 6 and thereby recorded onto the format sheets, so that authentication sheets or setting sheets are prepared.

Then, the control section 1 determines whether description of a reading procedure for the authentication sheets or setting sheets is necessary (step S20). When the user has specified through the user interface 2 that description of a reading procedure is necessary, it is determined that description of a reading procedure is necessary (S20: YES). Thus, the control section 1 executes later-described description process for the reading procedure (step S21). When this description process has been completed or alternatively when it is determined at step S20 that description of a reading procedure is unnecessary (S20: NO), the processing of this flow chart is terminated.

Figure 9:
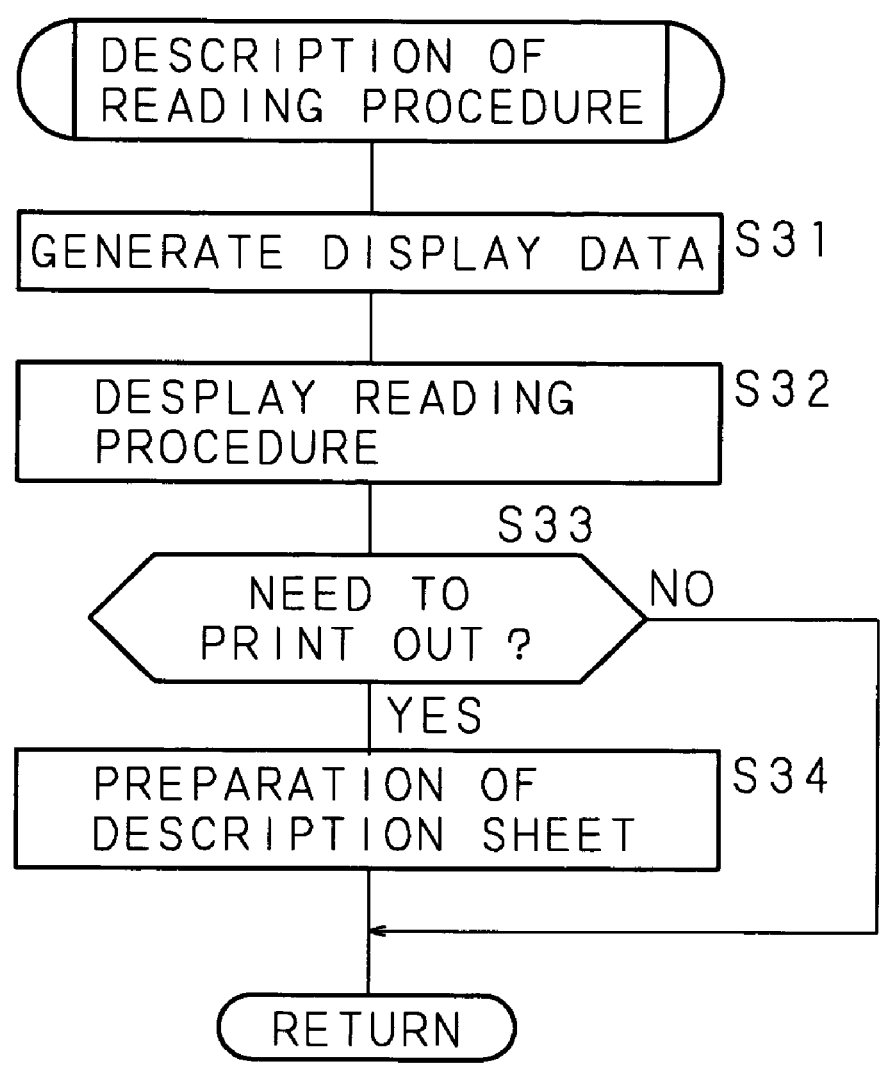
FIG. 9 is a flow chart showing a procedure of executing description process for a reading procedure.

FIG. 9 is a flow chart showing a procedure of executing description process for a reading procedure. In executing the description process for a reading procedure, the control section 1 generates display data for describing a reading procedure on the basis of the method of use of the format sheets and the combination of patterns determined at step S17 in the flow chart shown in FIG. 4 (step S31). Then, in accordance with the generated display data, the control section 1 drives the display section of the user interface 2 and thereby displays the reading procedure (step S32). Then, the control section 1 receives through the user interface the selection whether the reading procedure need be printed, and thereby determines whether the reading procedure need be printed, on the basis of the received information (step S33).

When it is determined that the description procedure need be printed (S33: YES), the control section 1 converts the display data into image data for printing, then transfers the image data to the image forming section 6, and thereby records the image data on a paper sheet, so that a description sheet is prepared (step S34). The contents recorded on the description sheet is described later. When preparation of the description sheet has been completed at step S34 (S34) or alternatively when it is determined at step S33 that printing of the description procedure is unnecessary (S33: NO), processing in this routine is terminated.

Here, the present embodiment has been described for the case that the selection whether a description sheet is to be prepared is received after the reading procedure is displayed on the display section of the user interface 2. However, the selection concerning the display of the reading procedure and the selection concerning the preparation of a description sheet may be received, so that any one of the display of the reading procedure and the preparation of a description sheet may solely be performed in response to the selection result.

Figure 10A:
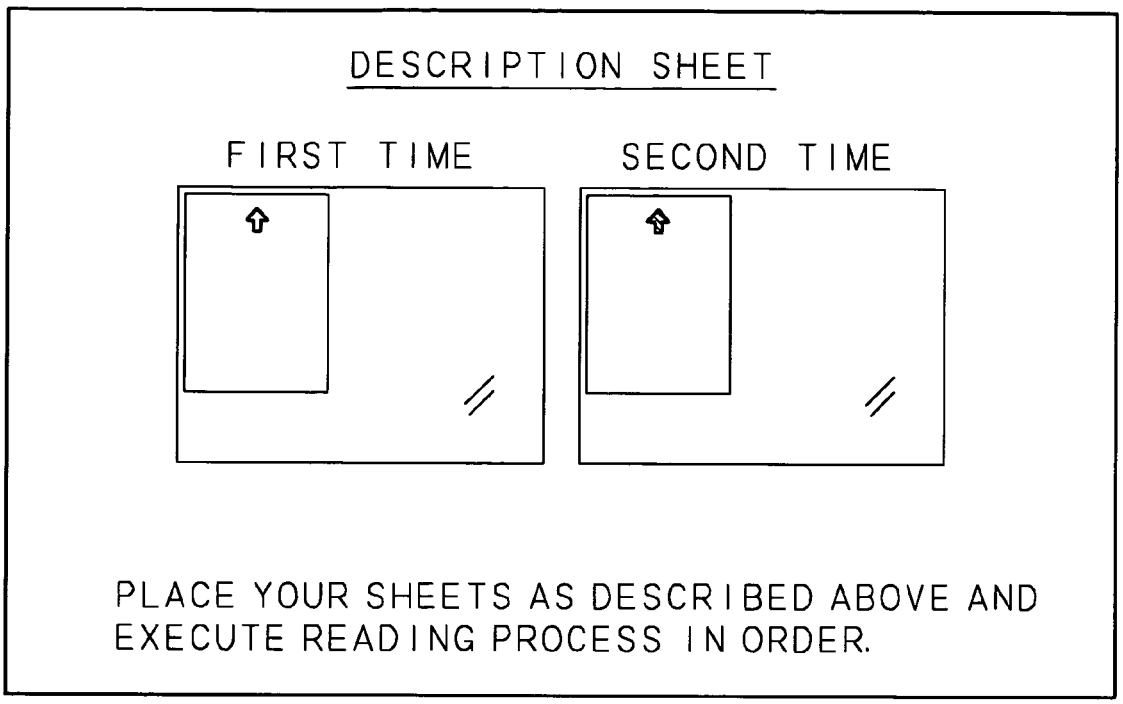
FIGS. 10A and 10B are schematic diagrams showing description sheets prepared by a digital combined machine.
Figure 10B:
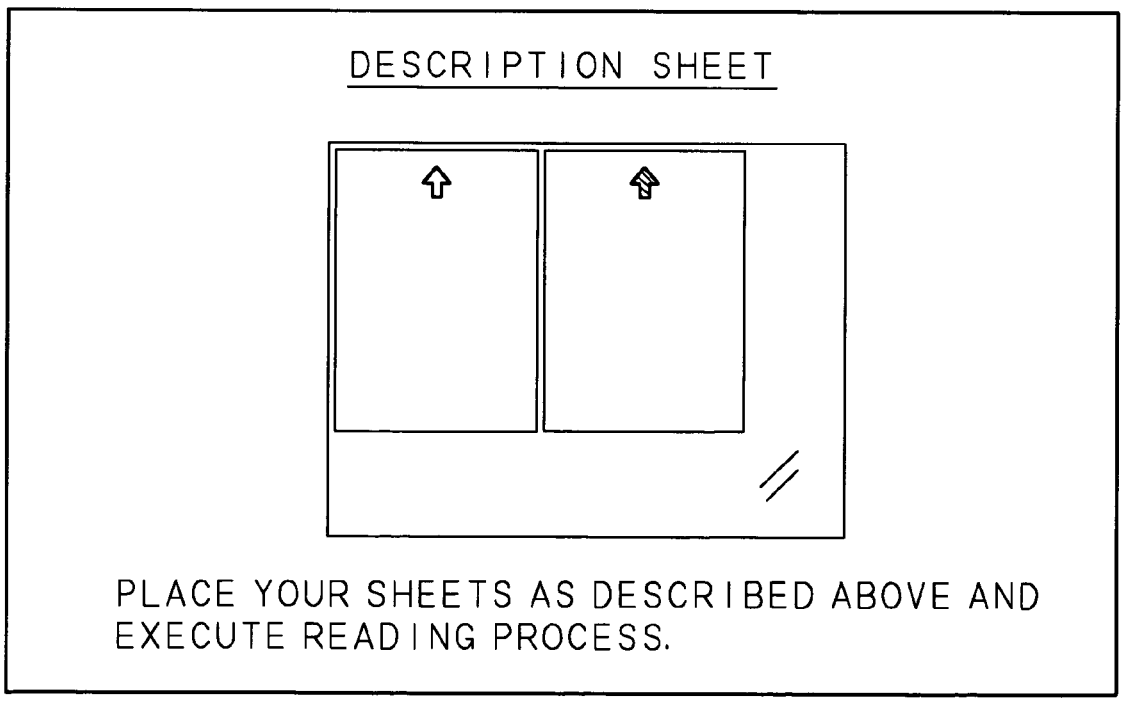

FIGS. 10A and 10B are schematic diagrams showing description sheets prepared by the digital combined machine. The description sheet is a sheet for schematically describing a method of use of authentication sheets or setting sheets. The description sheet shown in FIG. 10A specifies that two authentication sheets (or setting sheets) should be placed on the manuscript table 100 sequentially so that reading process should be executed. Further, the indicators provided in the authentication sheets or setting sheets specify the order of reading of these two format sheets and the orientation of the format sheets to be placed on the manuscript table 100. The description sheet shown in FIG. 10B specifies that two authentication sheets (or setting sheets) should be aligned to each other on the manuscript table 100 so that reading process should be executed. Further, the indicators provided in the authentication sheets or setting sheets specify the arrangement relation of these two format sheets and the orientation of the format sheets to be is placed on the manuscript table 100.

Figure 11A:
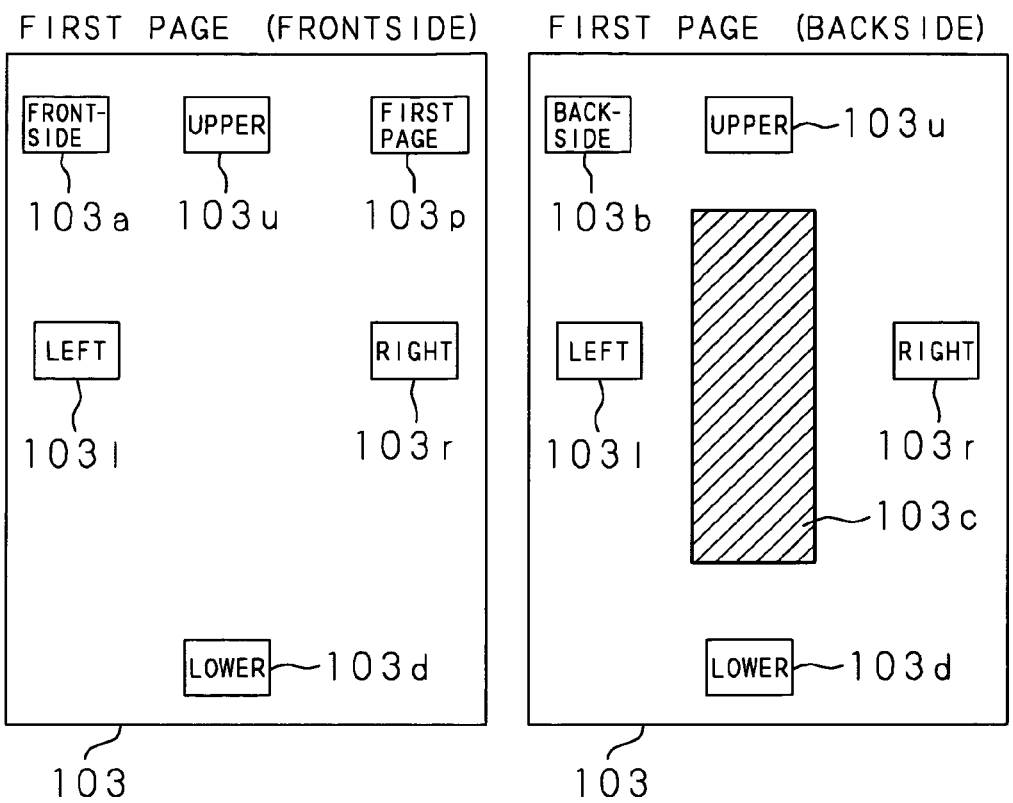
FIGS. 11A and 11B are schematic diagrams showing other examples of authentication sheets or setting sheets.
Figure 11B:
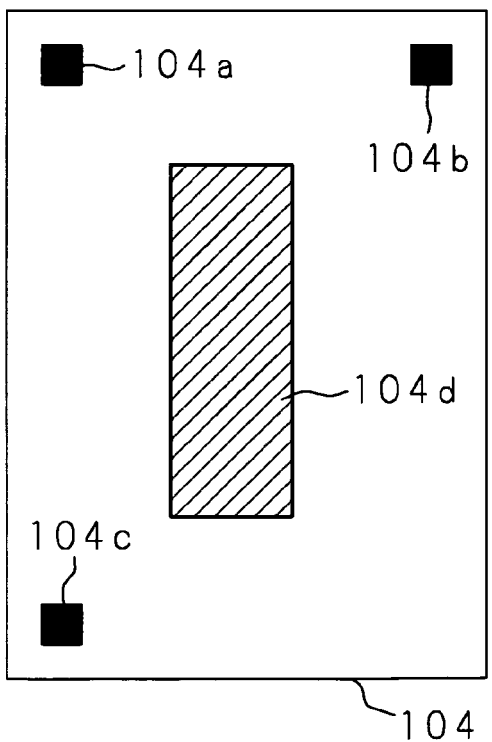

In the authentication sheets or setting sheets described above, arrow marks each provided with a color, a pattern, or the like have been used for specifying the order of reading of the format sheets and the orientation of placing on the manuscript table 100. However, these arrow marks are not indispensable. That is, character strings or other geometrical figures may be used for specifying. FIGS. 11A and 11B are schematic diagrams showing other examples of authentication sheets or setting sheets. The example shown in FIG. 11A is provided with: indicators 103a and 103b for specifying the frontside and the backside of a format sheet 103; indicators 103u, 103d, 103l, and 103r for specifying the up, down, left, and right directions of the format sheet 103; and an indicator 103p for specifying the page number of the format sheet 103. As a result, these indicators specify the order of reading and the orientation of the format sheets to be placed on the manuscript table 100. In this case, the user places the format sheet 103 in such a manner that the backside (that is, the surface provided with the pattern 103c) of the format sheet 103 should oppose the manuscript table 100 and that the top edge of the format sheet 103 is located on the far side of the manuscript table 100. Then, the user executes reading process. As such, in the example shown in FIG. 11A, indicators employing character strings are used for specifying the order of reading and the orientation of placing. This reduces the probability that the user makes a mistake concerning the order of reading and the orientation of placing.

In the example shown in FIG. 11B, quadrangle indicators 104a-104c are used. These indicators 104a-104c are arranged respectively at the vertices of a right triangle, and recorded on the same face as the surface where a pattern 104d for detection is recorded. When the image reading section 3 reads the format sheet provided with these indicators 104a-104c and the pattern 104d and thereby detects the pattern 104d, the control section 1 first extracts the indicators 104a-104c, and then calculates a line segment passing through the indicator 104a and the indicator 104b, a line segment passing through the indicator 104b and the indicator 104c, and a line segment passing through the indicator 104c and the indicator 104a. Then, the control section 1 extracts as a reference point an indicator located at a point where two line segments cross with each other at right angles (indicator 104a in the case of FIG. 11B). Then, the image is rotated in such a manner that the extracted reference point should be located at the upper left corner. Then, detection of the pattern 104d is performed on the basis of the rotated image. When such image processing is performed, even in a case that the format sheet 104 is placed in an inappropriate orientation, the pattern recognition section 8 can appropriately detect the original pattern 104d.

Figure 12A:
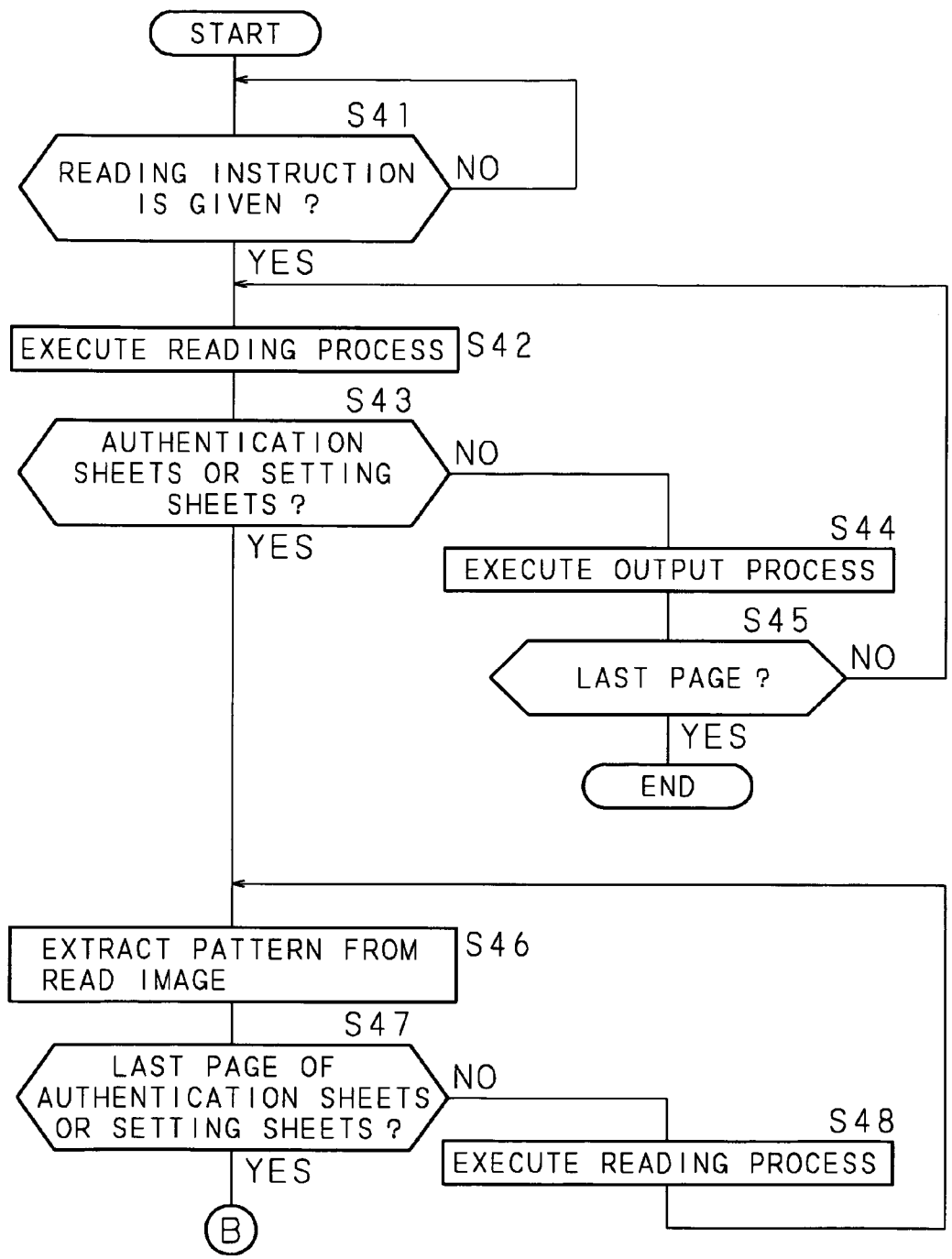
FIGS. 12A and 12B are flow charts describing a procedure of processing executed by a digital combined machine when authentication process or setup process is performed.
Figure 12B:
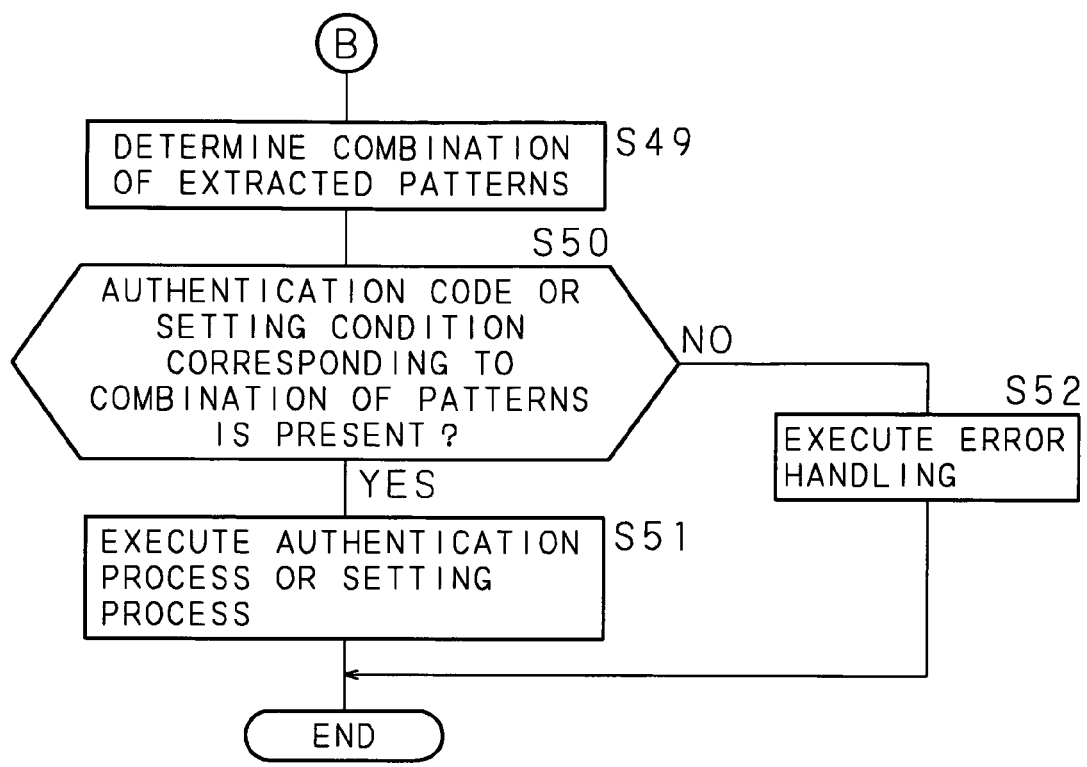

Next, a procedure of authentication process and setup process using authentication sheets and setting sheets is described below. FIGS. 12A and 12B are flow charts describing a procedure of processing executed by the digital combined machine when authentication process or setup process is performed. The control section 1 of the digital combined machine monitors information inputted through the user interface 2, and thereby determines whether a reading instruction for a format sheet is given (step S41). When it is determined that no reading instruction is given (S41: NO), the controller awaits a reading instruction. Further, when it is determined that a reading instruction is given (S41: YES), the control section 1 controls the image reading section 3, and thereby executes reading process for the format sheet placed on the manuscript table 100 (step S42).

Then, on the basis of the image obtained in the reading process, the control section 1 determines whether the read-out format sheet is an authentication sheet or a setting sheet (step S43). When it is determined that the read-out format sheet is an authentication sheet or a setting sheet (S43: YES), the control section 1 extracts a pattern from said image (step S46). The extraction of the pattern is performed by a method that the image acquired by the image reading section 3 is transferred to the pattern recognition section 8 so that whether a predetermined pattern is included is detected using a technique such as pattern matching. The information of the extracted pattern is stored into the RAM of the control section 1.

After extracting the pattern, the control section 1 determines whether the sheet is the last page of authentication sheets or setting sheets (step S47). When it is determined that the sheet is not the last page of authentication sheets or setting sheets (S47: NO), that is, when two authentication sheets (or setting sheets) are to be read in order while it is determined that the second authentication sheet (or setting sheet) is not yet read, the control section 1 performs reading process again (step S48) and then returns the processing to step S46.

When it is determined that the sheet is the last page of authentication sheets or setting sheets (S47: YES), the control section 1 determines the combination of patterns extracted at step S46 (step S49). Then, the control section 1 searches the authentication code management table 9a and the setting condition management table 10a, and thereby determines whether an authentication code or a setting condition is present that corresponds to the combination of patterns determined at step S49 (step S50).

When it is determined that an authentication code or a setting condition is present (S50: YES), the control section 1 executes authentication process or setup process (step S51). Specifically, when an authentication code is present that is stored in the authentication code management table 9a, authentication process is performed so that the use of various functions is permitted. When a setting condition is present that is stored in the setting condition management table 10a, setup concerning a specified function is performed in accordance with the setting condition. Further, when it is determined that no authentication code or setting condition is present (S50: NO), error handling is executed (step S52). Specifically, a message indicating that no corresponding authentication code or setting condition is registered is displayed on the display section of the user interface 2. Here, access restriction may be performed as the error handling. For example, the reading of format sheets may be restricted for a predetermined time, or alternatively a warning message may be reported.

On the other hand, at step S43, when it is determined that the format sheet is not an authentication sheet or a setting sheet (S43: NO), the control section 1 executes output process (step S44). The output process executed by the digital combined machine includes copy process, image transmission process, and electronic filing process. In copy process, the read-out image is transferred to the image forming section 6 so that the image is recorded on a paper sheet. In image transmission process, the read-out image is transferred to the communication section 4 and thereby transmitted to the outside. At that time, the image may be coded into the form of facsimile data and then transmitted to the outside. Alternatively, the image may be transmitted to the outside in a manner attached to an electronic mail. In electronic filing process, the read-out image is transferred to the storing section 5 and thereby stored into a predetermined storage area. Then, the control section 1 determines whether output process has been performed on the last page (step S45). When it is determined that output process is not yet performed on the last page (S45: NO), the procedure returns to step S42. When it is determined that output process has been performed on the last page (S45: YES), the processing of this flow chart is terminated.

Figure 13:
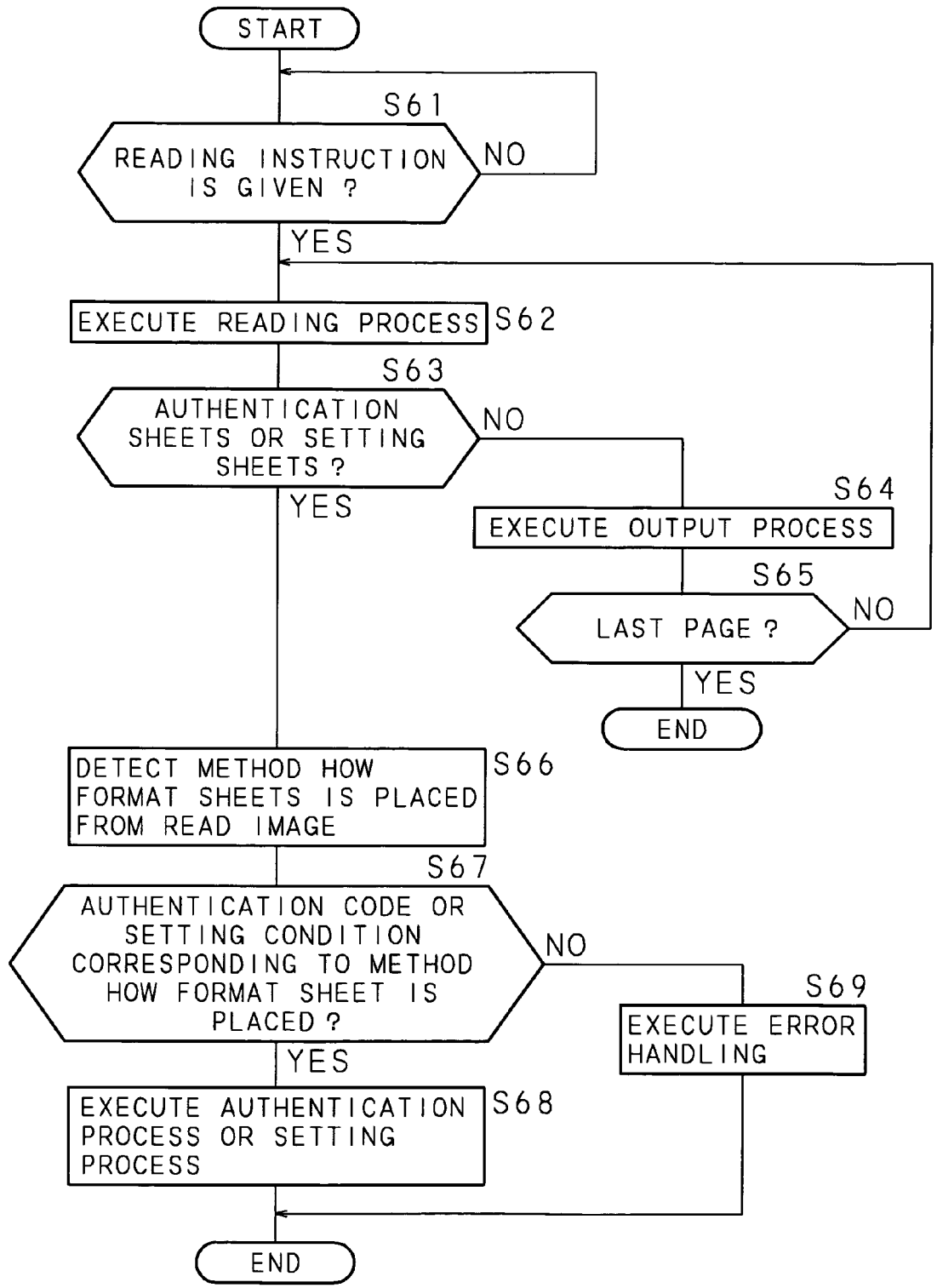
FIG. 13 is a flow chart describing a procedure of processing executed by a digital combined machine when authentication process or setup process is performed.

In the above-mentioned flow chart, authentication process or setup process has been performed on the basis of patterns read from authentication sheets or setting sheets. However, authentication process or setup process may be performed on the basis of a method how the authentication sheets or the setting sheets are placed on the manuscript table 100. FIG. 13 is a flow chart describing a procedure of processing executed by the digital combined machine when authentication process or setup process is performed. The control section 1 of the digital combined machine monitors information inputted through the user interface 2, and thereby determines whether a reading instruction for a format sheet is given (step S61). When it is determined that no reading instruction is given (S61: NO), the controller awaits a reading instruction. Further, when it is determined that a reading instruction is given (S61: YES), the control section 1 controls the image reading section 3, and thereby executes reading process for the format sheet placed on the manuscript table 100 (step S62).

Then, on the basis of the image obtained in the reading process, the control section 1 determines whether the read-out format sheet is an authentication sheet or a setting sheet (step S63). When it is determined that the read-out format sheet is an authentication sheet or a setting sheet (S63: YES), the method how the format sheet is placed extracted from the read-out image (step S64). At that time, the detection may be performed on the basis of a pattern provided in the format sheet, or alternatively on the basis of the shape of the format sheet which is detectable from the image.

After detecting the method how the format sheet is placed, the control section 1 refers to a table as shown in FIG. 8, and thereby determines whether an authentication code or a setting condition is present that corresponds to the method how the format sheet is placed (step S67). When it is determined that an authentication code or a setting condition is present (S67: YES), the control section 1 executes authentication process or setup process similar to the above-mentioned one (step S68). Further, when it is determined that no authentication code or setting condition is present (S67: NO), error handling is executed (step S69). Specifically, a message indicating that no corresponding authentication code or setting condition is registered is displayed on the display section of the user interface 2. Here, access restriction may be performed as the error handling. For example, the reading of format sheets may be restricted for a predetermined time, or alternatively a warning message may be reported.

On the other hand, at step S63, when it is determined that the format sheet is not an authentication sheet or a setting sheet (S63: NO), the control section 1 executes output process (step S64). The output process executed in by digital combined machine includes copy process, image transmission process, and electronic filing process. In copy process, the read-out image is transferred to the image forming section 6 so that the image is recorded on a paper sheet. In image transmission process, the read-out image is transferred to the communication section 4 and thereby transmitted to the outside. At that time, the image may be coded into the form of facsimile data and then transmitted to the outside. Alternatively, the image may be transmitted to the outside in a manner attached to an electronic mail. In electronic filing process, the read-out image is transferred to the storing section 5 and thereby stored into a predetermined storage area. Then, the control section 1 determines whether output process has been performed on the last page (step S65). When it is determined that output process is not yet performed on the last page (S65: NO), the procedure returns to step S62. When it is determined that output process has been performed on the last page (S65: YES), the processing of this flow chart is terminated.

Here, the present embodiment has been described for the case that two authentication sheets (or setting sheets) are used in combination. However, obviously, three or more authentication sheets (or setting sheets) may be used in combination in the authentication process (or setup process).

Further, the present embodiment has been described for the case that the pattern generation section 7, the pattern recognition section 8, the authentication section 9, and the setting section 10 are implemented as separate hardware sections. However, these sections may be constructed as a single hardware piece (for example, an IC chip).

Embodiment 2

In Embodiment 1, all of the patterns read from authentication sheets or setting sheets have been used so that the combination of patterns has been determined. However, authentication sheets or setting sheets may be used in which a dummy pattern not used in a combination is added. In the following description, a pattern not used in a combination is referred to as a dummy pattern. A page provided with a dummy pattern is referred to as a dummy page.

FIG. 14 is a schematic diagram showing an example of authentication sheets. In the example shown in FIG. 14, the frontside and backside of two authentication sheets 105 and 106 are expected to be used in combination. A pattern 105*a* (pattern 1) is recorded on the frontside of the first authentication sheet 105, while a pattern 105*b* (pattern 2) is recorded on the backside. Further, a dummy pattern 106*a* is recorded on the frontside of the second authentication sheet 106, while a pattern 106*b* (pattern 3) is recorded on the backside. In the present embodiment, the image reading section 3 reads the pages in predetermined order except for the page provided with the dummy pattern 106*a*, and thereby executes authentication process.

Here, the selection whether a dummy pattern is to be added can be set up arbitrarily by a user through the user interface 2.

FIG. 15 is a diagram describing the order of reading of the authentication sheets 105 and 106. In the example shown in FIG. 15, the frontside of the authentication sheet 105, the backside of the authentication sheet 106, and the backside of the authentication sheet 105 are expected to be read in this order. Thus, after the frontside of the authentication sheet 105 and the backside of the authentication sheet 106 are read in this order, if the frontside of the authentication sheet 106 were read, the order of reading would be unauthorized one. Further, even when all of the frontside of the authentication sheet 105, the backside of the authentication sheet 106, and the backside of the authentication sheet 105 are read, if the frontside of the authentication sheet 106 were read in the course of the reading, the order of reading would be unauthorized one. When unauthorized reading order is detected, authentication process is inhibited, or alternatively the operation of the digital combined machine is stopped temporarily. Thus, unauthorized access is prevented.

Figure 16:
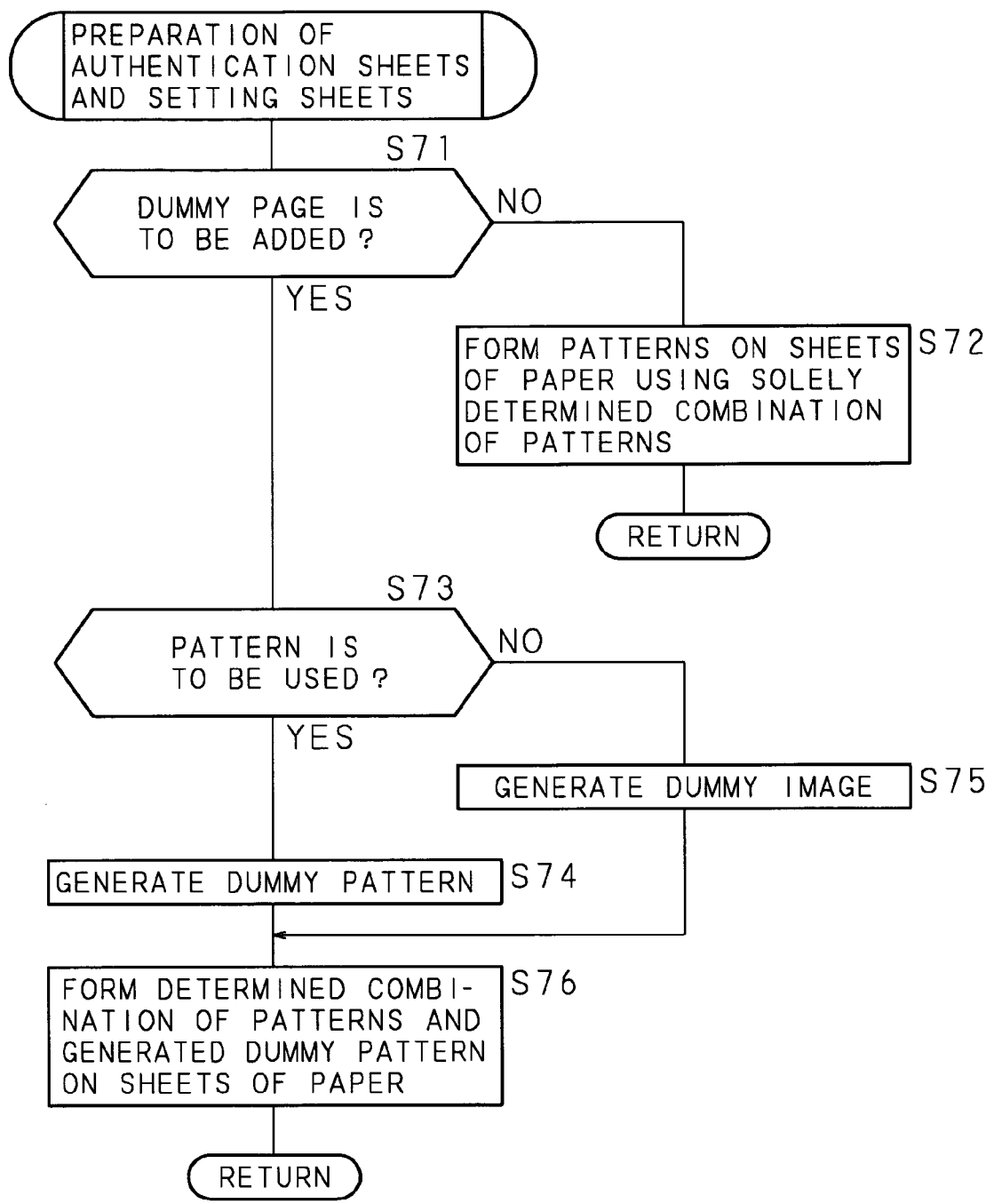
FIG. 16 is a flow chart showing a procedure of executing preparation process for authentication sheets or setting sheets.

FIG. 16 is a flow chart showing a procedure of executing preparation process for authentication sheets or setting sheets. On the basis of the selection received through the user interface 2, the control section 1 determines whether a dummy page is to be added (step S71). When it is determined that no dummy page is to be added (S71: NO), the control section 1 forms patterns on paper sheets using solely a combination of patterns determined at step S17 of the flow chart shown in FIG. 4 (step S72).

Further, when it is determined that a dummy page is to be added (S71: YES), it is determined whether a pattern is to be used (step S73). When it is determined that a pattern is to be used (S73: YES), the control section 1 controls the pattern generation section 7 and thereby generates a dummy pattern (step S74). Further, when it is determined that no pattern is to be used (S73: NO), a dummy image is generated (step S75). Here, the dummy image generated at step S75 need not be discriminated from the dummy pattern generated at step S74. Thus, each of these is generically referred to as a dummy pattern in the following description.

Then, the control section 1 forms on paper sheets the combination of patterns determined at step S17 of the flow chart shown in FIG. 4 and the generated dummy pattern (step S76). Here, the page in which the dummy pattern is formed may be set up arbitrarily by the control section 1. The information of that page may be stored in the RAM in the control section 1. Then, when display data is generated in the description process for a reading procedure described above (see FIG. 9) or alternatively when a description sheet is printed, a method of use of the authentication sheets or setting sheets may be explained to the user with taking into consideration the page.

As described above, according to the present embodiment, a dummy pattern not used in a combination is employed so that the combination of patterns is diversified. Thus, an authorized user or users who know the method of use (the order of reading) of the authentication sheets or setting sheets are solely allowed to use the digital combined machine or change the setting of the functions.

Embodiment 3

In Embodiment 2, a dummy pattern has been formed in a part of pages of the authentication sheets or setting sheets. However, an ordinary pattern and a dummy pattern may be formed in the same page of authentication sheet or setting sheet.

Figure 17:
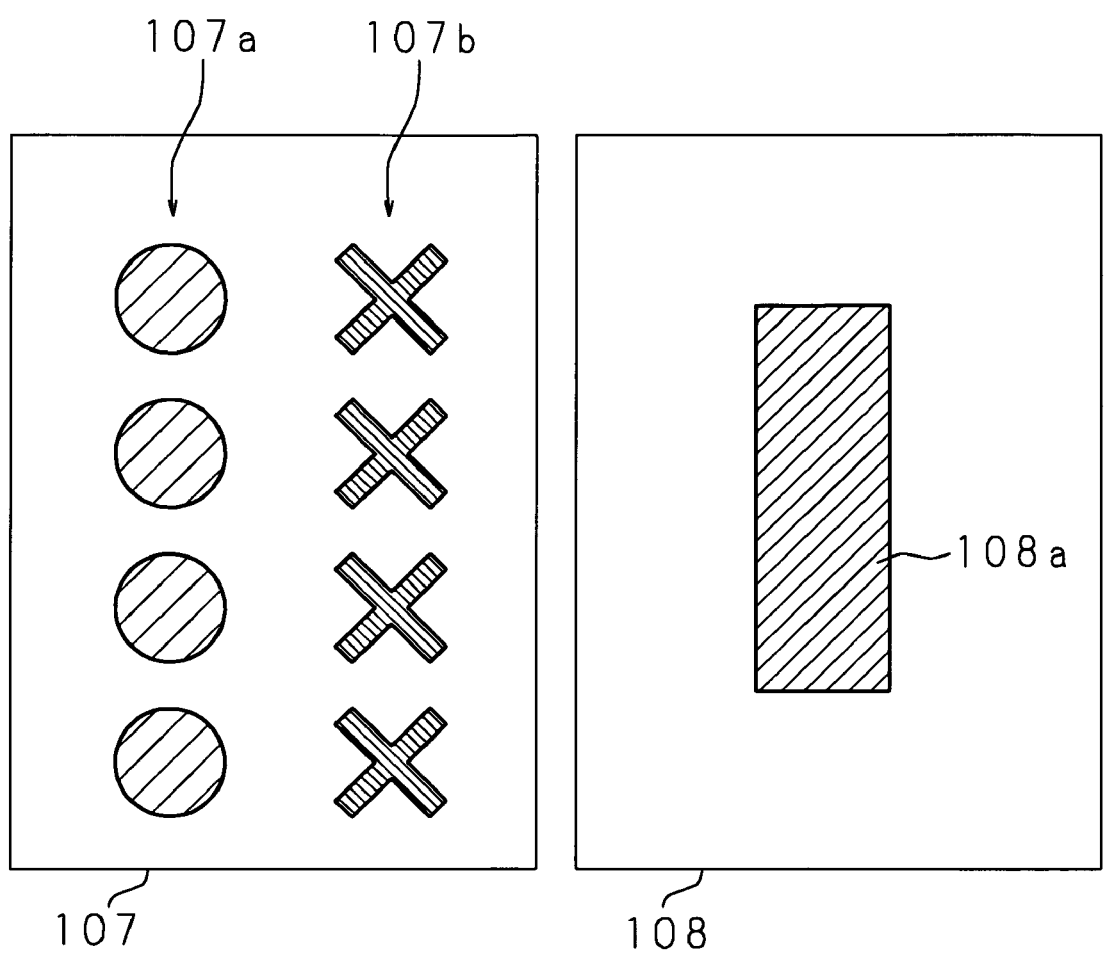
FIG. 17 is a schematic diagram showing an example of authentication sheets.

FIG. 17 is a schematic diagram showing an example of authentication sheets. In the example shown in FIG. 17, two authentication sheets 107 and 108 are expected to be used in combination. In addition to an ordinary pattern 107*a*, a dummy pattern 107*b* is recorded on the first authentication sheet 107. An ordinary pattern 108*a* is solely recorded on the second authentication sheet 108. Here, the selection whether a dummy pattern is to be added can be set up arbitrarily by a user through the user interface 2.

Figure 18A:
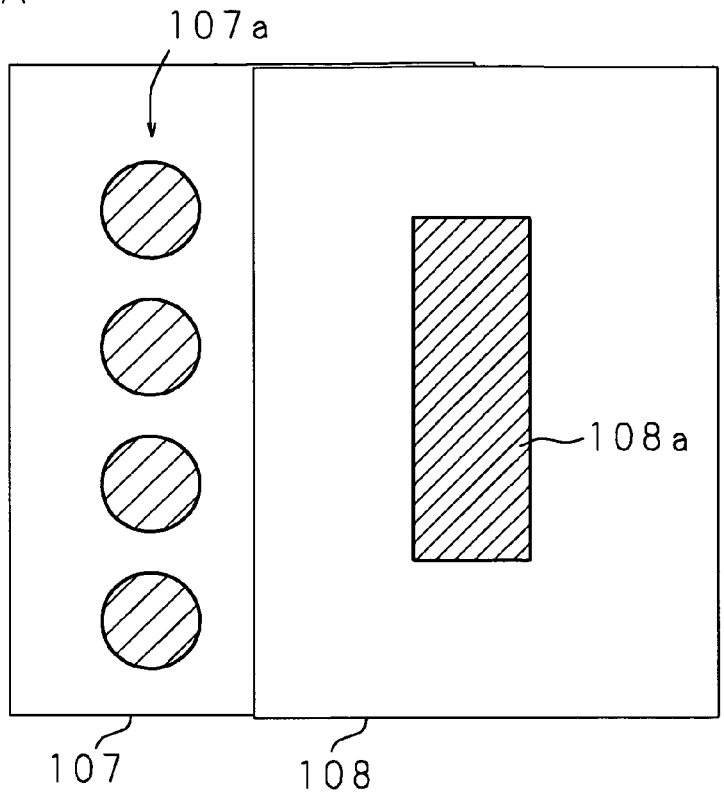
FIGS. 18A and 18B are diagrams describing a method of use of authentication sheets.
Figure 18B:
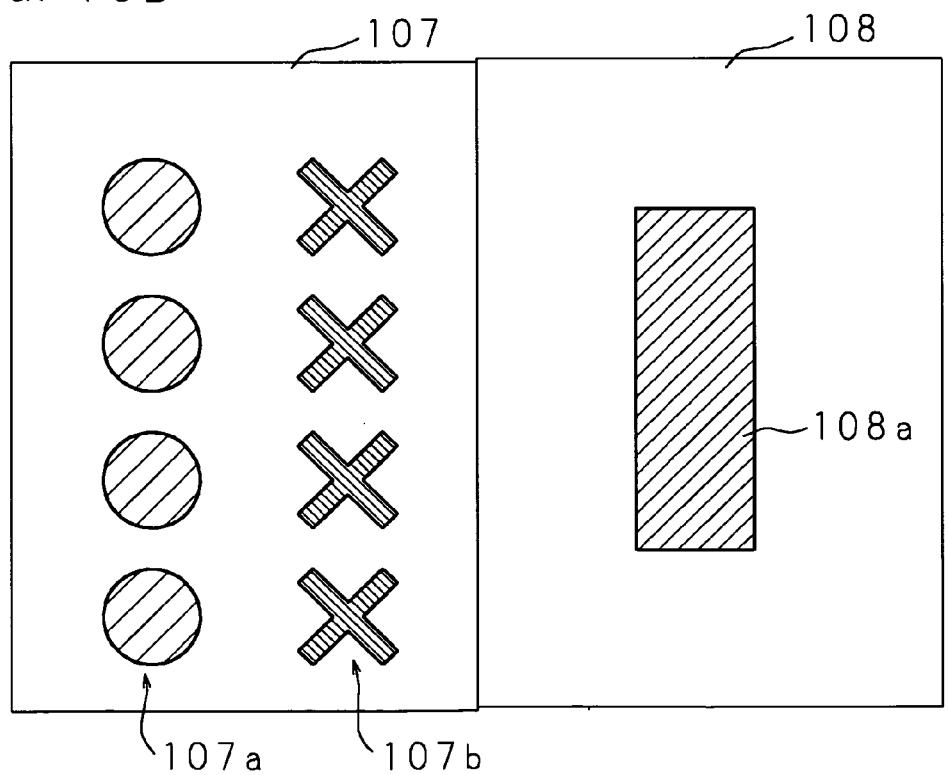

FIGS. 18A and 18B are diagrams describing a method of use of the authentication sheets 107 and 108. In the present embodiment, reading is performed in a state that the authentication sheet 108 overlaps and covers a region of the authentication sheet 107 where the dummy pattern 107*b* is recorded (see FIG. 18A). As a result, the digital combined machine detects solely the pattern 107*a* recorded on the authentication sheet 107 and the pattern 108*a* recorded on the authentication sheet 108. At that time, the control section 1 determines that the authentication sheets 107 and 108 are used appropriately, and thereby performs authentication process.

On the other hand, as shown in FIG. 18B, if the image were read in a state that the two authentication sheets 107 and 108 were placed on the manuscript table 100 such as not to overlap with each other, the dummy pattern 107*b* would be detected in addition to the patterns 107*a* and 108*a*. In such a case, the control section 1 determines that the authentication sheets 107 and 108 are used in an unauthorized manner. Thus, authentication process is inhibited, or alternatively the operation of the digital combined machine is stopped temporarily, so that unauthorized access is prevented.

Figure 19:
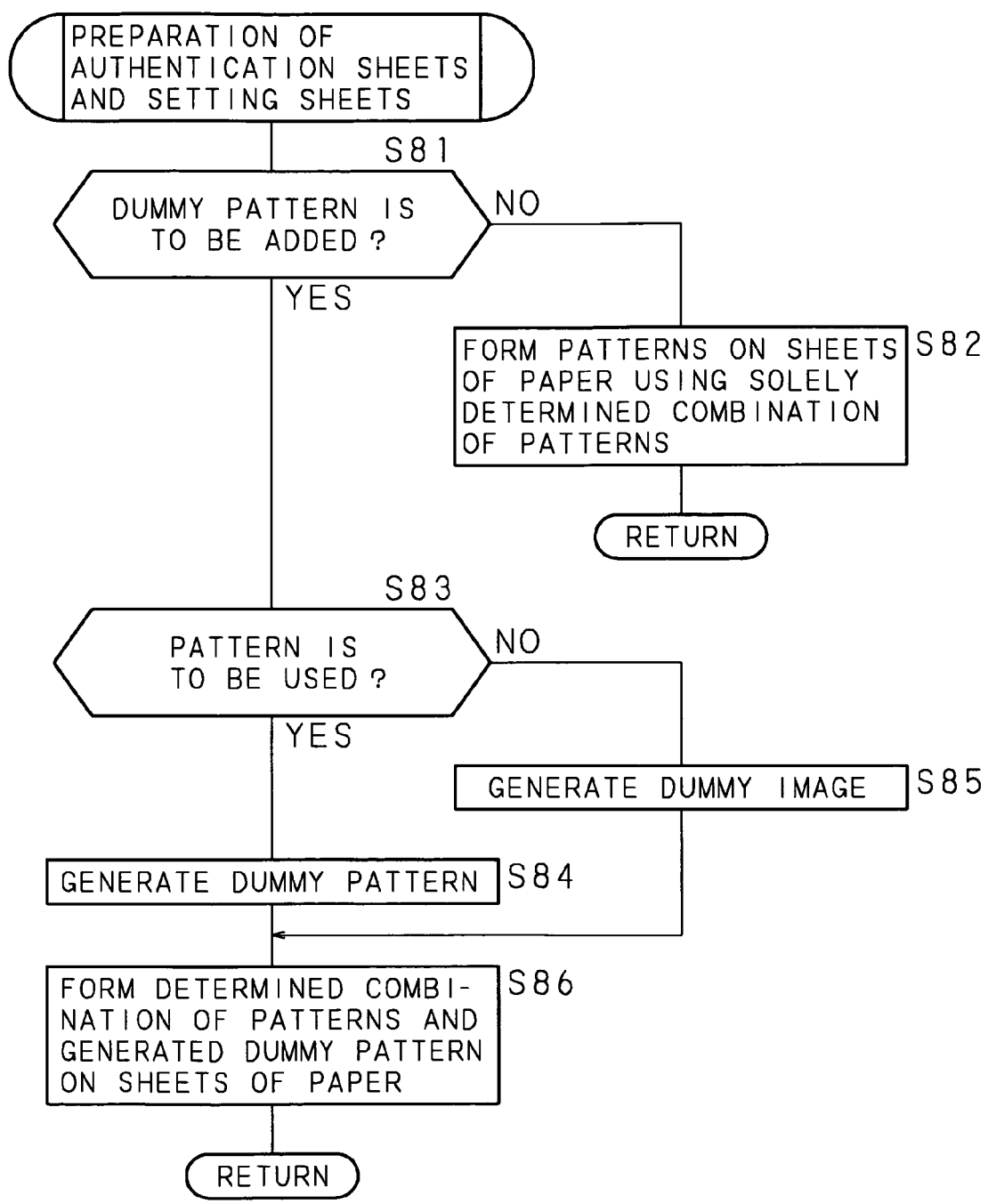
FIG. 19 is a flow chart showing a procedure of executing preparation process for authentication sheets or setting sheets.

FIG. 19 is a flow chart showing a procedure of executing preparation process for authentication sheets or setting sheets. On the basis of the selection received through the user interface 2, the control section 1 determines whether a dummy pattern is to be added (step S81). When it is determined that no dummy pattern is to be added (S81: NO), the control section 1 forms patterns on paper sheets using solely a combination of patterns determined at step S17 of the flow chart shown in FIG. 4 (step S82).

Further, when it is determined that a dummy pattern is to be added (S81: YES), it is determined whether a pattern is to be used (step S83). When it is determined that a pattern is to be used (S83: YES), the control section 1 controls the pattern generation section 7 and thereby generates a dummy pattern (step S84). Further, when it is determined that no pattern is to be used (S83: NO), a dummy image is generated (step S85). Here, the dummy image generated at step S85 need not be discriminated from the dummy pattern generated at step S84. Thus, each of these is generically referred to as a dummy pattern in the following description.

Then, the control section 1 forms on paper sheets the combination of patterns determined at step S17 of the flow chart shown in FIG. 4 and the generated dummy pattern (step S86). Here, the position where the dummy pattern is formed may be set up arbitrarily by the control section 1. The information of that formation position may be stored in the RAM in the control section 1. Then, when display data is generated in the description process for a reading procedure described above (see FIG. 9) or alternatively when a description sheet is printed, a method of use of the authentication sheets or setting sheets may be explained to the user with taking into consideration the page.

Here, in the present embodiment, two authentication sheets (or setting sheets) are used in an overlapping manner. Thus, indicators serving as a reference of overlapping position may be recorded. FIG. 20 is a schematic diagram showing another example of an authentication sheet. In the example shown in FIG. 20, patterns 109a and 109b are recorded respectively on the frontside and the backside of the authentication sheet 109. Further, indicators serving as a reference of overlapping position are recorded. The indicators 109c are composed of equally spaced scale marks provided in the horizontal and vertical directions. Data concerning the scale marks may be recorded in advance, for example, into the ROM in the control section 1. Then, when necessary, the data may be read from the ROM, and then recorded on the authentication sheet.

As described above, according to the present embodiment, the combination of patterns is diversified without causing complexity in the reading procedure. Thus, an authorized user or users who know the method of use (the order of reading) of the authentication sheets or setting sheets are solely allowed to use the digital combined machine or change the setting of the functions.

Embodiment 4

In the embodiments described above, plural kinds of patterns have been detected as independent patterns. However, a single pattern may be divided and recorded separately on a plurality of format sheets.

Figure 21:
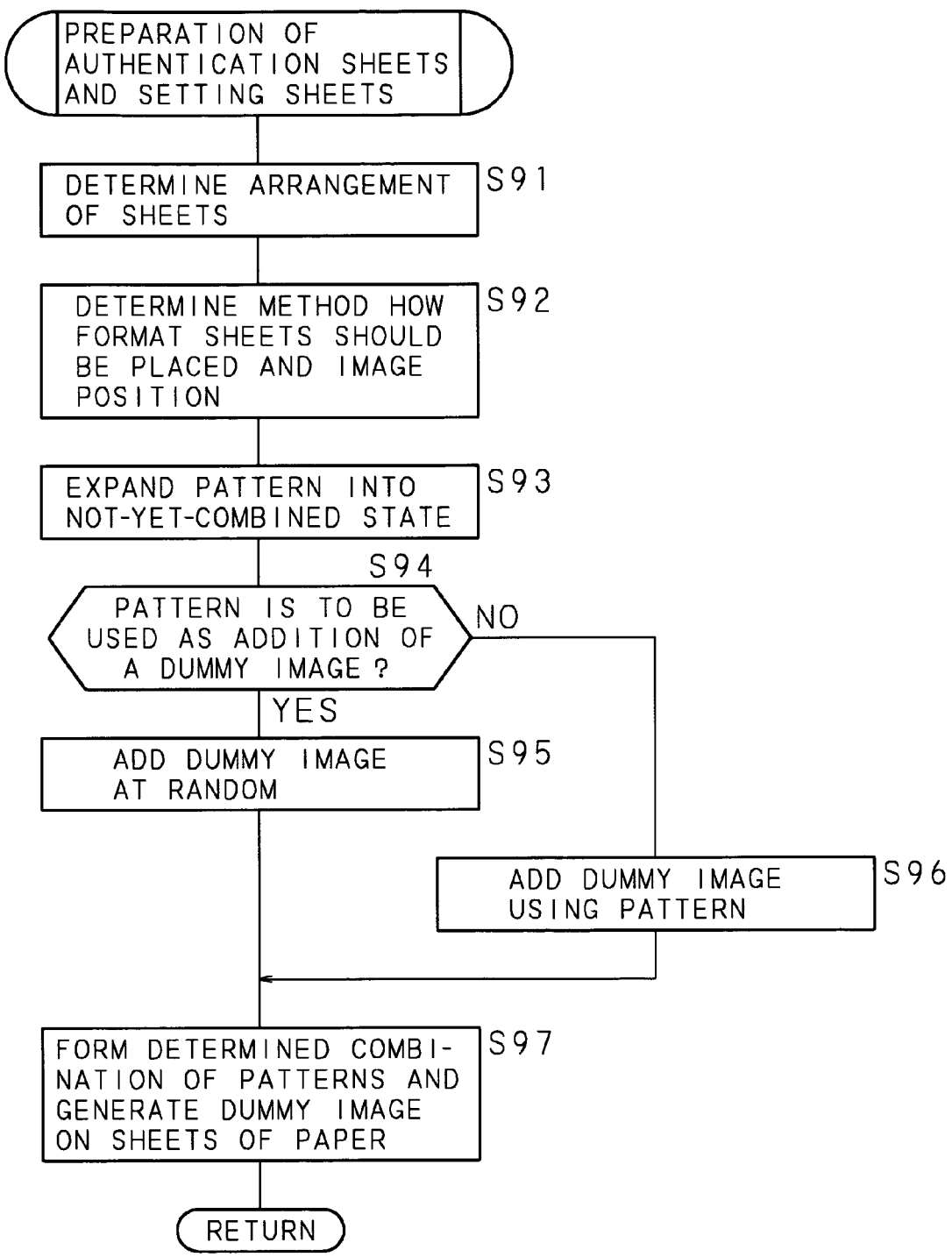
FIG. 21 is a flow chart showing a procedure of executing preparation process for authentication sheets or setting sheets.
Figure 22A:
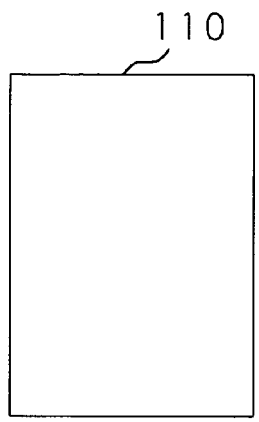
FIGS. 22A to 22D are schematic diagrams showing a preparation process.
Figure 22B:
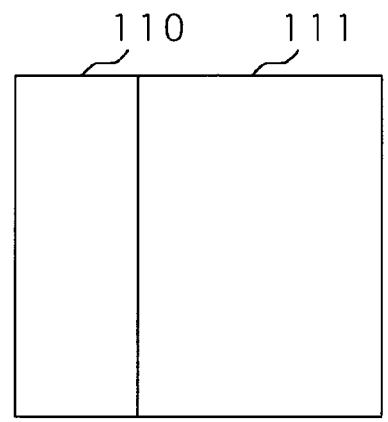
Figure 22C:
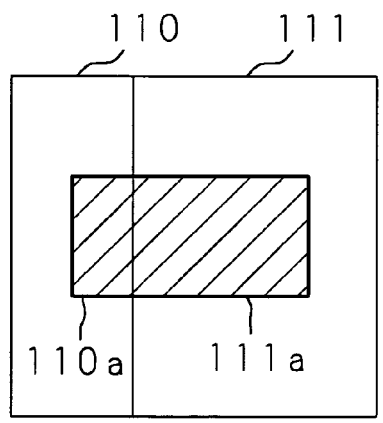
Figure 22D:
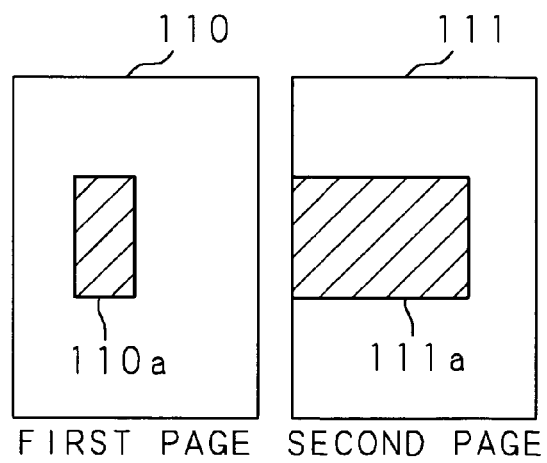

FIG. 21 is a flow chart showing a procedure of executing preparation process for authentication sheets or setting sheets. FIGS. 22A to 22D are schematic diagrams showing a preparation process. First, the control section 1 of the digital combined machine determines a combined condition (step S91). That is, when two format sheets 110 and 111 are to be used as shown in FIG. 22A, the control section 1 determines a state that the sheets 110 and 111 overlap with each other (see FIG. 22B). Then, the control section 1 determines a method how the format sheets should be placed such as to overlap with each other; and the position of an image (step S92). The position of an image may be at random or alternatively predetermined. At this time, a single pattern composed of continuously formed two (sub-)patterns 110a and 111a are assumed to be formed on the two format sheets 110 and 111 as shown in FIG. 22C. Then, the control section 1 expands the pattern into a not-yet-combined state as shown in FIG. 22D (step S93).

Then, the control section 1 determines whether a pattern is to be used as addition of a dummy image (step S94). When it is determined that no pattern is to be used as addition of a dummy image (S94: NO), the control section 1 adds a dummy image at random (step S95). When it is determined that a pattern is to be used as addition of a dummy image (S94: YES), the control section 1 adds a dummy image using a pattern (step S96). Then, the control section 1 forms on paper sheets the pattern of the combination determined at step S93 and the generated dummy pattern (step S97).

Embodiment 5

In the embodiments described above, the recognition process for patterns provided in authentication sheets or setting sheets and the authentication process or setup process performed when authentication sheets or setting sheets are read have been implemented within a single apparatus. However, the information concerning the authentication code and the setting condition for the apparatus may be managed in a server apparatus. Then, the authentication process and the setup process may be performed by accessing this server apparatus when necessary.

Figure 23:
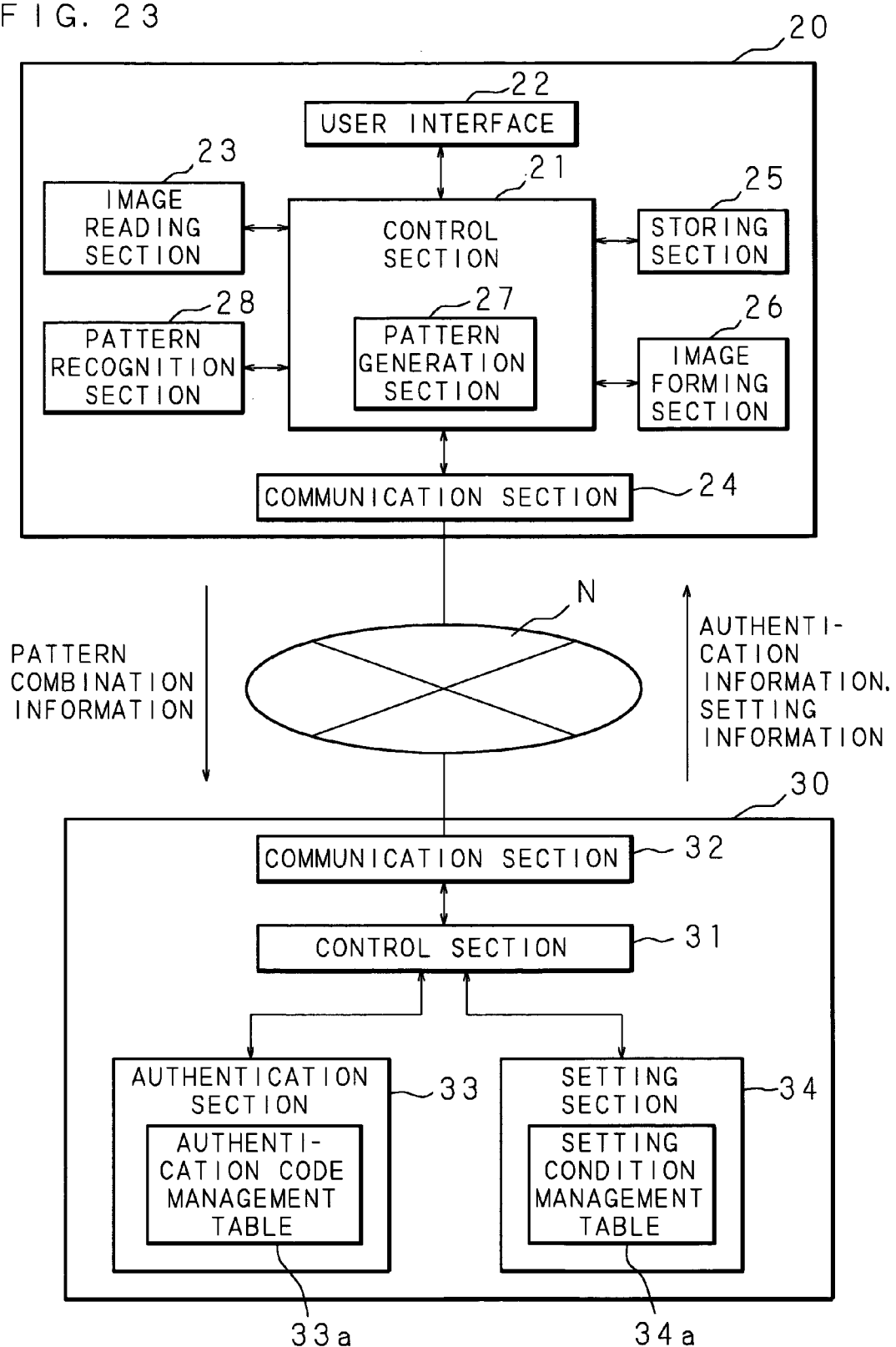
FIG. 23 is a block diagram showing the configuration of a system provided with a digital combined machine and a server apparatus according to an embodiment.

FIG. 23 is a block diagram showing the configuration of a system provided with a digital combined machine and a server apparatus according to the present embodiment. This system comprises: a digital combined machine 20; and a server apparatus 30 connected to the digital combined machine 20 via a communication network N. The digital combined machines 20 includes a control section 21 that is provided with a CPU, a ROM, a RAM, and the like and thereby serves as a control center. The control section 21 is connected to a user interface 22, an image reading section 23, a communication section 24, a storing section 25, an the image forming section 26, a pattern recognition section 28, and the like. When the control section 21 loads onto the RAM a control program stored in the ROM in advance and then executes the program, the operation of these hardware sections is controlled so that the apparatus serves as an image reading apparatus or an image recording apparatus according to the present invention.

Here, the operation of the hardware sections is similar to that described in Embodiment 1. When the digital combined machine 20 is to prepare authentication sheets or setting sheets, patterns are read from the pattern generation section 27 on the basis of information inputted through the user interface 22. Then, the read-out patterns are transferred to the image forming section 26 and thereby recorded on paper sheets, so that authentication sheets or setting sheets are prepared. Further, when patterns provided in authentication sheets or setting sheets are to be read, the image data acquired by the image reading section 23 is transferred to the pattern recognition section 28. Then, the pattern recognition section 28 performs pattern matching and thereby acquires information (pattern combination information) concerning the combination of patterns provided in a plurality of the format sheets. The acquired pattern combination information is transmitted to the server apparatus 30 via the communication section 24.

Further, in the digital combined machine 20, after the pattern combination information is transmitted, when authentication information or setting information transmitted from the server apparatus 30 is received, authentication process or setup process is performed in accordance with the received information.

The server apparatus 30 includes a control section 31 provided with a CPU, a ROM, a RAM, and the like. The control section 31 is connected to a communication section 32, an authentication section 33, and a setting section 34. The communication section 32 is provided with a communication interface according to the telecommunications standard of the communication network N, and thereby receives information transmitted from the digital combined machine 20 and transmits information to be notified to the digital combined machine 20. As such, the communication section 32 controls the transmission and reception of various kinds of information.

The authentication section 33 is provided with an authentication code management table 33a in which authentication codes and pattern combination information are stored in a manner corresponding to each other. When pattern combination information is received in the communication section 32, the authentication section 33 searches the information stored in the authentication code management table 33a, and thereby determines whether any agreeing pattern combination information is present, so that user authentication is performed. The authenticated result is transmitted as authentication information to the digital combined machine 20.

The setting section 34 is provided with a setting condition management table 34a in which various kinds of setting conditions and pattern combination information are stored in a manner corresponding to each other. When pattern combination information is received in the communication section 32, the setting section 34 searches the information stored in the setting condition management table 34a, then reads information corresponding to agreeing pattern combination information, and thereby acquires information concerning the setting condition. The acquired information concerning the setting condition is transmitted as setting information to the digital combined machine 20.

As described above, according to the present embodiment, the information concerning the authentication code and the setting condition is managed in the server apparatus 30. Thus, even when a plurality of digital combined machines 20 are connected to a communication network N, each digital combined machine 20 need not manage the information concerning the authentication code and the setting condition.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image reading apparatus comprising:
a reading section for reading an image recorded on a sheet;
a storing section for storing processing information for use in a processing to be executed, in a manner corresponding to pattern information about a combination of patterns to be detected from the read image; and
a controller capable of performing operations of:
detecting a pattern in each of images read from a plurality of sheets;
combining all the patterns respectively recorded on a plurality of the read sheets;
obtaining a single piece of information based on the combination of the detected patterns;
searching for the obtained information in the pattern information stored in said storing section;
reading from said storing section the processing information stored in a manner corresponding to the pattern information, when the pattern information is found; and
executing a processing based on the read processing information.

2. The image reading apparatus according to claim 1, wherein:
the processing information stored in said storing section is authentication information for a user; and
said controller is capable of performing an operation of authenticating a user by using the authentication information.

3. The image reading apparatus according to claim 1, wherein:
the processing information stored in said storing section is a set condition about said processing; and
said controller is capable of performing an operation of setting up processing to be executed in accordance with said set condition.

4. The image reading apparatus according to claim 1, wherein the pattern information stored in said storing section is information about types of patterns.

5. The image reading apparatus according to claim 4, wherein the pattern information stored in said storing section includes information about a layout of the patterns.

6. The image reading apparatus according to claim 1, wherein said reading section reads a plurality of sheets sequentially or simultaneously.

7. The image reading apparatus according to claim 1, wherein said controller is further capable of performing operations of:
judging whether or not the detected pattern is a predetermined pattern; and
inhibiting execution of said processing, when it is judged that the detected pattern is the predetermined pattern.

8. The image reading apparatus according to claim 1, wherein said controller is further capable of performing operations of:
judging whether or not a predetermined combination of patterns is detected, on the basis of the obtained information about the combination of patterns; and
inhibiting execution of said processing when it is judged that the predetermined combination of patterns is detected.

9. The image reading apparatus according to claim 1, further comprising a receiving section for receiving processing information and pattern information, wherein
said controller is capable of performing an operation of storing the two pieces of received information in said storing section in a manner corresponding to each other.

10. The image reading apparatus according to claim 1 wherein at least one of said detected patterns is a dummy pattern that is not used in said combining.

11. An image processing system comprising:
an image reading apparatus for reading an image recorded on a sheet; and
an image processing apparatus for detecting plural types of patterns from the image read by said image reading apparatus and then executing a processing in accordance with the detected result, wherein
said image processing apparatus comprises:
a storing section for storing processing information for use in a processing to be executed, in a manner corresponding to pattern information about a combination of patterns; and a controller capable of performing operations of:
combining all the patterns respectively recorded on a plurality of the read sheets;
obtaining a single piece of information based on combination of detected patterns based on a detection result when a pattern is detected from each of images read from a plurality of sheets;
searching for the obtained information in the pattern information stored in said storing section;
reading from said storing section the processing information stored in a manner corresponding to the pattern information, when the pattern information is found; and
executing said processing using the read processing information.

12. An image processing system comprising:
an image reading apparatus; and
an information transmitting apparatus, wherein
said image reading apparatus comprises:
a reading section for reading an image recorded on a sheet; and
a controller capable of performing operations of:
detecting a pattern in each of images read from a plurality of sheets;
combining all the patterns respectively recorded on a plurality of the read sheets;
obtaining a single piece of information based on the combination of detected patterns; and
transmitting the obtained information to said information transmitting apparatus, and wherein
said information transmitting apparatus comprises:
a storing section for storing processing information for use in a processing to be executed, in a manner corresponding to pattern information about a combination of patterns;
a receiving section for receiving the information transmitted from said image reading apparatus; and
a controller capable of performing operations of:
searching for the received information in the pattern information stored in said storing section; and
transmitting to said image reading apparatus the processing information stored in a manner corresponding to the pattern information, when the pattern information is found.

13. An image recording apparatus comprising:
the image reading apparatus according to claim 1; and
a recording section for recording on a sheet the image read by the image reading apparatus.

14. The image recording apparatus according to claim 13, further comprising a receiving section for receiving image data, wherein
an image is recorded on a sheet based on the image data received by the receiving section.

15. An image recording apparatus comprising:
a recording section for recording a pattern on a sheet so as to prepare a sheet to be read by the image reading apparatus according to claim 1;
a storing section for storing processing information to be used when predetermined processing is executed, in a manner corresponding to pattern information about a combination of patterns; and
a controller capable of performing operations of:
receiving processing information;
reading from said storing section the pattern information stored in a manner corresponding to the received processing information; and
recording a pattern on a sheet in accordance with the read pattern information.

16. The image recording apparatus according to claim 15, wherein said controller is capable of performing an operation of recording said pattern in fine patterns or invisible ink.

17. The image recording apparatus according to claim 15, wherein said controller is capable of performing an operation of recording information about a method of use of a sheet to be prepared, on said sheet.

18. The image recording apparatus according to claim 15, wherein said controller is further capable of performing an operation of providing information about a method of use of a sheet to be prepared.

19. An image recording apparatus comprising:
a recording section for recording a pattern on a sheet so as to prepare a sheet to be read by the image reading apparatus according to claim 1; and
a controller capable of performing operations of:
setting up processing information to be used when predetermined processing is executed;
generating pattern information about a combination of patterns in a manner corresponding to said processing information when said processing information is set up; and
recording a pattern on a sheet in accordance with the generated pattern information.

20. An image reading apparatus comprising:
reading means for reading an image recorded on a sheet;
detecting means for detecting plural types of patterns from the read image;
storing means for combining all the patterns respectively recorded on a plurality of the read sheets in a processing to be executed, in a manner corresponding to pattern information about a combination of patterns;
means for obtaining a single piece of information based on the combination of detected patterns on the basis of a detection result when said detecting means detects a pattern from each of images read from a plurality of sheets;
means for searching for the obtained information in the pattern information stored in said storing means;
means for reading from said storing means the processing information stored in a manner corresponding to the pattern information, when the pattern information is found by said means; and
means for executing said processing using the read processing information.

21. An image processing system comprising:
an image reading apparatus for reading an image recorded on a sheet; and
an image processing apparatus for detecting plural types of patterns from the image read by the image reading apparatus and then executing processing in accordance with the detected result, wherein
said image processing apparatus comprises:
storing means for storing processing information for use in a processing to be executed, in a manner corresponding to pattern information about a combination of patterns;
means for combining all the patterns respectively recorded on a plurality of the read sheets;
means for obtaining a single piece of information based on the combination of detected patterns based on a detection result when a pattern is detected from each of images read from a plurality of sheets;
means for searching for the obtained information in the pattern information stored in said storing means;
means for reading from said storing means the processing information stored in a manner corresponding to the pattern information, when the pattern information is found by said means; and means for executing said processing using the read processing information.

22. An image processing system comprising;
an image reading apparatus; and
an information transmitting apparatus, wherein
said image reading apparatus comprises:
reading means for reading an image recorded on a sheet;
means for detecting a pattern in each of images read from a plurality of sheets;
means for combining all the patterns respectively recorded on a plurality of the read sheets;
means for obtaining a single piece of information based on the combination of detected patterns; and
means for transmitting the obtained information to said information transmitting apparatus, and wherein
said information transmitting apparatus comprises:
storing means for storing processing information for use in a processing to be executed, in a manner corresponding to pattern information about a combination of patterns;
means for receiving the information transmitted from said image reading apparatus;
means for searching for the received information in the pattern information stored in said storing means; and
means for transmitting to said image reading apparatus the processing information stored in a manner corresponding to the pattern information, when the pattern information is found.

23. An image recording apparatus comprising:
the image reading apparatus according to claim 20; and
means for recording the image read by the image reading apparatus on a sheet.

24. The image recording apparatus according to claim 23, further comprising:
means for receiving image data; and
means for recording an image on a sheet based on the image data received by said means.

25. An image recording apparatus for recording a pattern on a sheet so as to prepare a sheet to be read by the image reading apparatus according to claim 20, comprising:
storing means for storing processing information to be used when predetermined processing is executed, in a manner corresponding to pattern information about a combination of patterns;
means for receiving processing information;
means for reading from said storing means the pattern information stored in a manner corresponding to the received processing information; and
means for recording a pattern on a sheet in accordance with the read pattern information.

26. An image recording apparatus for recording a pattern on a sheet so as to prepare a sheet to be read by the image reading apparatus according to claim 20, comprising:
means for setting up processing information to be used when predetermined processing is executed;
means for generating pattern information about a combination of patterns in a manner corresponding to said processing information when said processing information is set up; and
means for recording a pattern on a sheet in accordance with the generated pattern information.

\* \* \* \* \*